US008749399B2

(12) United States Patent
Petrovic et al.

(10) Patent No.: US 8,749,399 B2
(45) Date of Patent: Jun. 10, 2014

(54) SYSTEM AND METHOD FOR DOWNHOLE TELEMETRY

(71) Applicant: Mostar Directional Technologies Inc., Calgary (CA)

(72) Inventors: John Petrovic, Calgary (CA); Victor Petrovic, Calgary (CA); Matthew R. White, Calgary (CA); Neal P. Beaulac, Chestermere (CA)

(73) Assignee: Mostar Directional Technologies Inc., Calgary (CA)

( * ) Notice: Subject to any disclaimer, the term of this patent is extended or adjusted under 35 U.S.C. 154(b) by 0 days.

(21) Appl. No.: 14/010,600

(22) Filed: Aug. 27, 2013

(65) Prior Publication Data
US 2013/0342354 A1 Dec. 26, 2013

Related U.S. Application Data

(63) Continuation of application No. 13/418,019, filed on Mar. 12, 2012, now Pat. No. 8,547,245, which is a continuation of application No. 11/735,151, filed on Apr. 13, 2007, now Pat. No. 8,154,420, which is a continuation-in-part of application No. 11/538,277, filed on Oct. 3, 2006, now Pat. No. 7,573,397.

(30) Foreign Application Priority Data

Apr. 21, 2006 (CA) ..................................... 2544457

(51) Int. Cl.
*G01V 3/00* (2006.01)
(52) U.S. Cl.
USPC .......... 340/854.6; 340/854.3; 175/40; 367/83

(58) Field of Classification Search
USPC ................. 340/854.6, 854.3; 175/40; 367/83
See application file for complete search history.

(56) References Cited

U.S. PATENT DOCUMENTS 4,160,970 A 7/1979 Nicolson
4,348,672 A 9/1982 Givler
(Continued)

FOREIGN PATENT DOCUMENTS

CA 1255358 A 6/1989
CA 1301328 C 5/1992
(Continued)

OTHER PUBLICATIONS

Proceedings of the Ocean Drilling Program, Initial Reports, vol. 194, Mar. 28, 2002, pp. 30-36, Isern et al.

(Continued)

*Primary Examiner* — William P Neuder
(74) *Attorney, Agent, or Firm* — Brett J. Slaney; Blake, Cassels & Graydon LLP

(57) ABSTRACT

A system and method are provided for providing electromagnetic (EM) measurement-while-drilling (MWD) telemetry capabilities using an existing mud-pulse MWD tool. An EM tool intercepts the output from the mud-pulse tool and generates an EM signal that mimics a mud-pulse pressure signal. The EM signal is intercepted at the surface by a receiver module that conditions the signal and inputs the signal into the existing pulse tool receiver. Since the EM signal mimics a mud-pulse signal, the pulse tool receiver does not require software or hardware modifications in order to process an EM telemetry mode. The EM tool can be adapted to also provide dual telemetry by incorporating a conventional pressure pulser that would normally be used with the pulse tool.

22 Claims, 19 Drawing Sheets

(56) References Cited

U.S. PATENT DOCUMENTS

| | | | |
|---|---|---|---|
| 4,901,289 A | 2/1990 | Cretin et al. | |
| 4,945,761 A | 8/1990 | Lessi et al. | |
| 5,138,313 A | 8/1992 | Barrington | |
| 5,160,925 A | 11/1992 | Dailet et al. | |
| 5,456,106 A | 10/1995 | Harvey et al. | |
| 5,602,541 A | 2/1997 | Comeau et al. | |
| 5,749,605 A | 5/1998 | Hampton, III et al. | |
| 5,899,958 A | 5/1999 | Dowell et al. | |
| 5,924,499 A | 7/1999 | Birchak et al. | |
| 5,945,923 A | 8/1999 | Soulier | |
| 5,964,839 A | 10/1999 | Johnson et al. | |
| 6,050,353 A | 4/2000 | Logan et al. | |
| 6,098,727 A | 8/2000 | Ringgenberg et al. | |
| 6,144,316 A | 11/2000 | Skinner | |
| 6,158,532 A | 12/2000 | Logan et al. | |
| 6,177,882 B1 | 1/2001 | Ringgenbert et al. | |
| 6,224,997 B1 | 5/2001 | Papadopoulos | |
| 6,404,350 B1 | 6/2002 | Soulier | |
| 6,414,905 B1 | 7/2002 | Owens et al. | |
| 6,572,152 B2 | 6/2003 | Dopf et al. | |
| 6,727,827 B1 | 4/2004 | Edwards et al. | |
| 6,736,222 B2 | 5/2004 | Kuckes et al. | |
| 6,856,255 B2 | 2/2005 | Chalitsios et al. | |
| 6,909,667 B2 | 6/2005 | Shah et al. | |
| 6,926,098 B2 | 8/2005 | Peter | |
| 6,937,159 B2 | 8/2005 | Hill et al. | |
| 7,080,699 B2 | 7/2006 | Lovell et al. | |
| 7,255,183 B2 | 8/2007 | Cramer | |
| 7,268,696 B2 | 9/2007 | Rodney et al. | |
| 7,573,397 B2 | 8/2009 | Petrovic et al. | |
| 8,154,420 B2 * | 4/2012 | Petrovic et al. | 340/854.6 |
| 8,547,245 B2 * | 10/2013 | Petrovic et al. | 340/854.6 |
| 2003/0183384 A1 | 10/2003 | Das et al. | |
| 2004/0104047 A1 | 6/2004 | Peter | |
| 2006/0202852 A1 | 9/2006 | Peter et al. | |
| 2006/0220650 A1 | 10/2006 | Lovell et al. | |
| 2007/0052551 A1 | 3/2007 | Lovell et al. | |

FOREIGN PATENT DOCUMENTS

| | | |
|---|---|---|
| CA | 2209423 A1 | 1/1998 |
| CA | 2078090 C | 2/1999 |
| CA | 2282810 A1 | 3/2000 |
| CA | 2323654 A1 | 4/2001 |
| CA | 2329454 | 6/2001 |
| CA | 2096941 C | 7/2001 |
| CA | 2392670 A1 | 7/2001 |
| CA | 2436056 A1 | 9/2002 |
| CA | 2455396 | 1/2003 |
| CA | 2411083 A1 | 5/2003 |
| CA | 2476259 A1 | 8/2003 |
| CA | 2517328 | 8/2003 |
| CA | 2260307 | 12/2003 |
| CA | 2442475 A1 | 3/2004 |
| CA | 2499331 A1 | 4/2004 |
| CA | 2508374 A1 | 6/2004 |
| CA | 2506808 | 7/2004 |
| CA | 2420402 | 8/2004 |
| CA | 2515193 A1 | 8/2004 |
| CA | 2232213 | 9/2004 |
| CA | 2469574 | 12/2004 |
| CA | 2471067 A1 | 12/2004 |
| CA | 2201552 C | 1/2005 |
| CA | 2476370 | 1/2005 |
| CA | 2476521 | 2/2005 |
| CA | 2495170 A1 | 7/2005 |
| CA | 2460371 A1 | 9/2005 |
| CA | 2249300 | 10/2005 |
| CA | 2261686 C | 2/2006 |
| CA | 2496170 A1 | 8/2006 |
| CA | 2552514 | 2/2007 |
| WO | WO 00/13349 A1 | 3/2000 |
| WO | WO 2004/061269 A1 | 7/2004 |

OTHER PUBLICATIONS

National Energy Technology Laboratory, Project No. DE-AC26-97FT34175. "Development of a High Temperature Logging While Drilling Tool." Jun. 1, 2005.

* cited by examiner

SYSTEM AND METHOD FOR DOWNHOLE TELEMETRY

This application is a continuation of U.S. patent application Ser. No. 13/418,019 filed on Mar. 12, 2012, which is a continuation of U.S. patent application Ser. No. 11/735,151 filed on Apr. 13, 2007 (now U.S. Pat. No. 8,154,420), which is a continuation-in-part of U.S. patent application Ser. No. 11/538,277 filed on Oct. 3, 2006 (now U.S. Pat. No. 7,573,397), which claims priority from Canadian Patent Application No. 2,544,457 filed on Apr. 21, 2006, the contents of these applications being incorporated herein by reference.

FIELD OF THE INVENTION

The present invention relates generally to data acquisition during earth drilling operations and telemetry systems therefor, and has particular utility in measurement while drilling (MWD) applications.

DESCRIPTION OF THE PRIOR ART

The recovery of subterranean materials such as oil and gas typically requires drilling wellbores a great distance beneath the earth's surface towards a repository of the material. The earthen material being drilled is often referred to as "formation". In addition to drilling equipment situated at the surface, a drill string extends from the equipment to the material formation at the terminal end of the wellbore and includes a drill bit for drilling the wellbore.

The drill bit is rotated and drilling is accomplished by either rotating the drill string, or by use of a downhole motor near the drill bit. Drilling fluid, often termed "mud", is pumped down through the drill string at high pressures and volumes (e.g. 3000 p.s.i. at flow rates of up to 1400 gallons per minute) to emerge through nozzles or jets in the drill bit. The mud then travels back up the hole via the annulus formed between the exterior of the drill string and the wall of the wellbore. On the surface, the drilling mud may be cleaned and then re-circulated. The drilling mud serves to cool and lubricate the drill bit, to carry cuttings from the base of the bore to the surface, and to balance the hydrostatic pressure in the formation.

A drill string is generally comprised of a number of drill rods that are connected to each other in seriatim. A drill rod is often referred to as a "sub", and an assembly of two or more drill rods may be referred to as a "sub-assembly".

It is generally desirable to obtain information relating to parameters and conditions downhole while drilling. Such information typically relates to one or more characteristics of the earth formation that is being traversed by the wellbore such as data related to the size, depth and/or direction of the wellbore itself; and information related to the drill bit such as temperature, speed and fluid pressure. The collection of information relating to conditions downhole, commonly referred to as "logging", can be performed using several different methods. Well logging in the oil industry has been known for many years as a technique for providing information to the driller regarding the particular earth formation being drilled.

In one logging technique, a probe or "sonde" that houses formation sensors is lowered into the wellbore once drilling has progressed or completed. The probe is supported by and connected to the surface via an electrical wireline, and is used to obtain data and send the data to the surface. A paramount problem with obtaining downhole measurements via a wireline is that the drilling assembly must be removed or "tripped" from the wellbore before the probe can be lowered into the wellbore to obtain the measurements. Tripping a drill string is typically time consuming and thus costly, especially when a substantial portion of the wellbore has been drilled.

To avoid tripping the drill string, there has traditionally been an emphasis on the collection of data during the drilling process. By collecting and processing data during the drilling process, without the necessity of tripping the drill string, the driller can make modifications or corrections to the drilling process as necessary. Such modifications and corrections are typically made in an attempt to optimize the performance of the drilling operation while minimizing downtime. Techniques for concurrently drilling the well and measuring downhole conditions are often referred to as measurement-while-drilling (MWD). It should be understood that MWD will herein encompass logging-while-drilling (LWD) and seismic-while-drilling (SWD) techniques, wherein LWD systems relate generally to measurements of parameters of earth formation, and SWD systems relate generally to measurements of seismic related properties.

In MWD systems, sensors or transducers are typically located at the lower end of the drill string which, while drilling is in progress, continuously or intermittently monitor predetermined drilling parameters and formation data. Data representing such parameters may then be transmitted to a surface detector/receiver using some form of telemetry. Typically, the downhole sensors employed in MWD applications are positioned in a cylindrical drill collar that is positioned as close to the drill bit as possible.

There are a number of telemetry techniques that have been employed by MWD systems to transmit measurement data to the surface without the use of a wireline tool.

One such technique involves transmitting data using pressure waves in drilling fluids such as drilling mud. This telemetry scheme is often referred to as mud-pulse telemetry. Mud-pulse telemetry involves creating pressure signals in the drilling mud that is being circulated under pressure through the drill string during the drilling operation. The information that is acquired by the downhole sensors is transmitted utilising a particular time division scheme to effectively create a waveform of pressure pulses in the mud column. The information may then be received and decoded by a pressure transducer and analysed by a computer at a surface receiver.

In a mud-pulse system, the pressure in the drilling mud is typically modulated via operation of a valve and control mechanism, generally termed a pulser or mud-pulser. The pulser is typically mounted in a specially adapted drill collar positioned above the drill bit. The generated pressure pulse travels up the mud column inside the drill string at the velocity of sound in the mud, and thus the data transmission rate is dependent on the type of drilling fluid used. Typically, the velocity may vary between approximately 3000 and 5000 feet per second. The actual rate of data transmission, however, is relatively slow due to factors such as pulse spreading, distortion, attenuation, modulation rate limitations, and other disruptive forces such as ambient noise in the transmission channel. A typical pulse rate is on the order of one pulse per second (i.e. 1 Hz).

An often preferred implementation of mud-pulse telemetry uses pulse position modulation for transmitting data. In pulse position modulation, pulses have a fixed width and the interval between pulses is proportional to the data value transmitted. Mud-pressure pulses can be generated by opening and closing a valve near the bottom of the drill string so as to momentarily restrict the mud flow. In a number of known MWD tools, a "negative" pressure pulse is created in the fluid by temporarily opening a valve in the drill collar so that some of the drilling fluid will bypass the bit, the open valve allowing direct communication between the high pressure fluid inside the drill string and the fluid at lower pressure returning to the surface via the exterior of the string. Alternatively, a "positive" pressure pulse can be created by temporarily restricting the downward flow of drilling fluid by partially blocking the fluid path in the drill string.

Electromagnetic (EM) radiation has also been used to telemeter data from downhole locations to the surface (and vice-versa). In EM systems, a current may be induced on the drill string from a downhole transmitter and an electrical potential may be impressed across an insulated gap in a downhole portion of the drill string to generate a magnetic field that will propagate through the earth formation. The signal that propagates through the formation is typically measured using a conductive stake that is driven into the ground at some distance from the drilling equipment. The potential difference of the drill string signal and the formation signal may then be measured, as shown in U.S. Pat. No. 4,160,970 published on Jul. 10, 1979.

Information is transmitted from the downhole location by modulating the current or voltage signal and is detected at the surface with electric field and/or magnetic field sensors. In an often preferred implementation of EM telemetry, information is transmitted by phase shifting a carrier sine wave among a number of discrete phase states. Although the drill string acts as part of the conductive path, system losses are almost always dominated by conduction losses within the earth which, as noted above, also carries the electromagnetic radiation. Such EM systems work well in regions where the earth's conductivity between the telemetry transmitter and the earth's surface is consistently low. However, EM systems may be affected by distortion or signal dampening due to geologic formations such as dry coal seams, anhydrite, and salt domes.

Telemetry using acoustic transmitters in the drill string has also been contemplated as a potential means to increase the speed and reliability of the data transmission from downhole to the surface. When actuated by a signal such as a voltage potential from a sensor, an acoustic transmitter mechanically mounted on the tubing imparts a stress wave or acoustic pulse onto the tubing string.

Typically, drillers will utilize one of a wireline system, a mud-pulse system, an EM system and an acoustic system, most often either an EM system or a mud-pulse system. Depending on the nature of the drilling task, it is often more favourable to use EM due to its relatively faster data rate when compared to mud-pulse. However, if a signal is lost due to the presence of the aforementioned geological conditions, the rig must be shut down and the drill string tripped to swap the EM system with an alternative system such as a mud-pulse system which, although slower, is generally more reliable. The drill string would then need to be re-assembled and drilling restarted. The inherent downtime while tripping the drill string can often be considerable and thus undesirable.

In general, one problem associated with mud-pulse telemetry is that it can only be used during the drilling operation as it relies on the flow of mud in the mud-column. When drilling is interrupted, e.g. when adding a sub to the drill string, there is no medium to transmit data.

It is therefore an object of the present invention to obviate or mitigate at least one of the above-mentioned disadvantages.

SUMMARY

In one aspect, there is provided a dual telemetry measurement while drilling tool string, the tool string comprising a plurality of modules interconnected lengthwise to enable the tool string to be deployed within a drill string, the plurality of modules comprising: a directional module operable to obtain data from at least one sensor; an electromagnetic transmitter module operable to receive a first data input representative of the data obtained by the directional module from the at least one sensor, and operable to send an electromagnetic signal through an earth formation using an electromagnetic signal generated using the first data input; a mud pulse module operable to receive a second data input representative of the data obtained by the directional module from the at least one sensor, and operable to use the second data input to have a series of pulses transmitted through a mud column in the drill string; and at least one battery module for powering the directional module, the electromagnetic transmitter module, and the mud pulse module.

In another aspect, there is provided a dual telemetry measurement while drilling system, the system comprising: a tool string comprising a plurality of modules interconnected lengthwise to enable the tool string to be deployed within a drill string, the plurality of modules comprising: a directional module operable to obtain data from at least one sensor; an electromagnetic transmitter module operable to receive a first data input representative of the data obtained by the directional module from the at least one sensor, and operable to send an electromagnetic signal through an earth formation using an electromagnetic signal generated using the first data input; a mud pulse module operable to receive a second data input representative of the data obtained by the directional module from the at least one sensor, and operable to use the second data input to have a series of pulses transmitted through a mud column in the drill string; and at least one battery module for powering the directional module, the electromagnetic transmitter module, and the mud pulse module; and at least one drill string component to be incorporated into the drill string for providing a region of isolation in the drill string.

BRIEF DESCRIPTION OF THE DRAWINGS

An embodiment of the invention will now be described by way of example only with reference to the appended drawings wherein:

FIG. 2(*b*) is an external plan view of a downhole portion of an EM tool drill string configuration.

FIG. 3(*b*) is an external plan view of a EM tool string.

DETAILED DESCRIPTION OF THE DRAWINGS

The following describes, in one embodiment, an MWD tool providing EM telemetry while utilizing existing pulse tool modules. In general, an EM signal is generated by repeating an amplified version of a conventional pulse signal that is intended to be sent to a pulse module, and transmitting this repeated signal to the surface in an EM transmission. In this way, the same components can be used without requiring knowledge of the encoding scheme used in the pulse signal. Therefore, the following system is compatible with any existing downhole directional module that generates a signal for a pulse module. The pulse signal can be intercepted, amplified, and sent to an EM surface system by applying a potential difference across a region of isolation in the drill string. The EM surface system receives, conditions and converts the received signal into a signal which is compatible with a conventional surface pulse decoder. In this way, existing software and decoding tools already present in the pulse surface decoder can be utilized while providing EM telemetry capabilities.

In another embodiment, the following provided dual pulse and EM telemetry capabilities by using a multiplexing scheme to direct the pulse signal to either the pulse module for transmission using pulse telemetry or to the EM transmitter module for transmission using EM telemetry. At the surface, the EM surface system receives either signal and routes the appropriate signal to the pulse decoder. The pulse decoder is unable to distinguish between telemetry modes enabling existing software and hardware offered by a pulse system can be used. It will be appreciated that the following examples are for illustrative purposes only.

Drilling Environment

Figure 1:
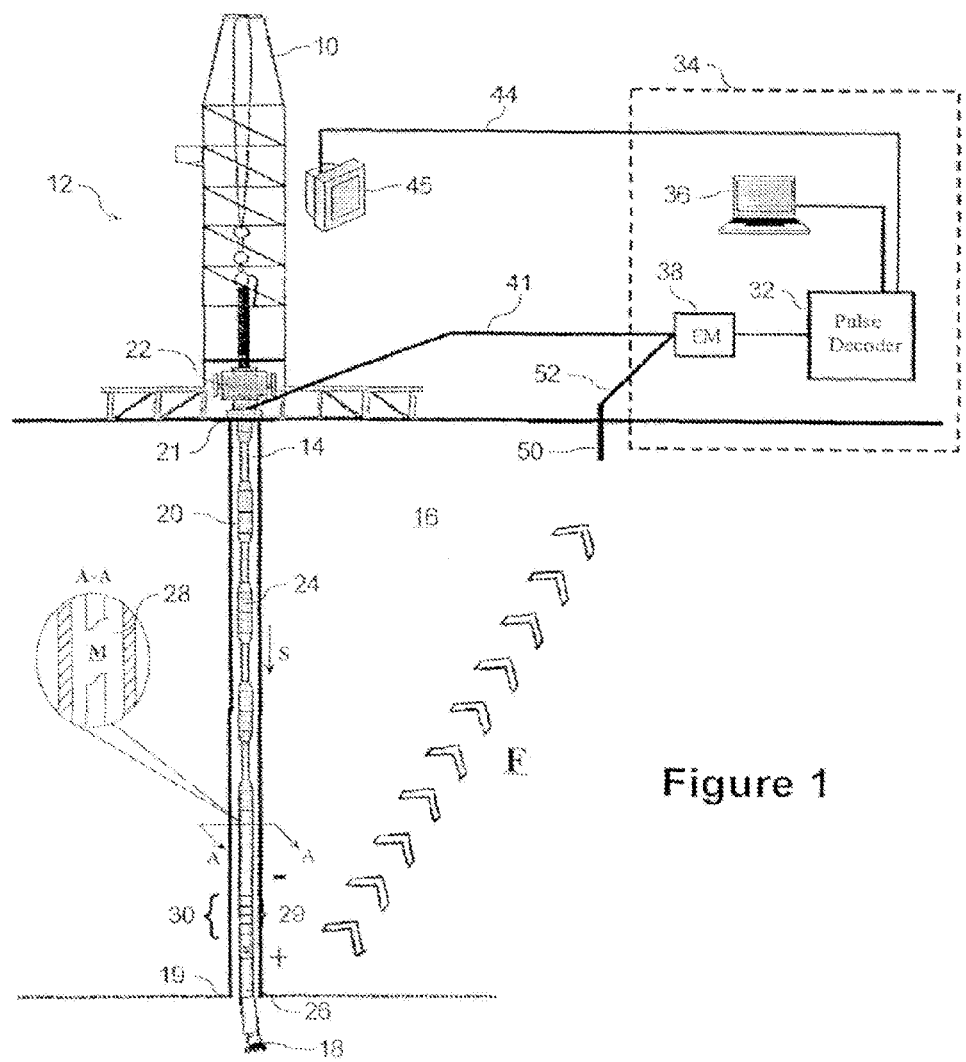
FIG. 1 is a schematic view of a drilling system and its environment.

Referring therefore to FIG. 1, a drilling rig 10 is shown in situ at a drilling site 12. The rig 10 drills a wellbore 14 into an earth formation 16. The wellbore 14 is excavated by operating a drill bit 18 disposed at a lower end 19 of a drill string 20. The drill string 20 is supported at an upper end 21 by drilling equipment 22. As the bit 18 drills into the formation 16, individual drill rods 24 are added to the drill string 20 as required. In the example shown in FIG. 1, the drill bit 18 is driven by a fluid or mud motor 26. The mud motor 26 is powered by having the drilling equipment 22 pump drill fluid, hereinafter referred to as "mud", through a hollow conduit 28 defined by interior portions of the connected subs 24. The column of fluid held in the conduit 28 will hereinafter be referred to as a "mud column" and generally denoted by the character "M".

An MWD tool 30 is located within the drill string 20 toward its lower end 19. The MWD tool 30 transmits data to the surface to a remote MWD surface station 34. The data transmitted to the surface is indicative of operating conditions associated with the drilling operation. In one embodiment, the MWD tool 30 transmits the data to a pulse tool surface system 32 via an EM surface system 38 using EM telemetry as explained below.

The EM surface system 38 is used to receive, condition and convert data transmitted in an EM signal such that the conditioned data is compatible with the pulse tool surface system 32. The EM surface system 38 thus acts as an EM signal conditioner and is configured to interface with the pulse decoder 32. Normally, a pressure transducer on the drilling equipment interfaces with the pulse decoder 32 and thus the interface between the EM surface system 38 and the pulse decoder 32 is preferably similar to the interface between the pulse decoder 32 and a connector from a data cable extending from the transducer. The pulse decoder 32 is connected to a computer interface 36, e.g. a personal computer in the surface station 34, to enable a user to interact with the MWD tool 30 remotely. The pulse decoder 32 also outputs a decoded signal to a rig floor display 45 via a data connection 44. Accordingly, the MWD tool 30 shown in FIG. 1 is configured to interface with and operate using existing mud pulse modules from an existing pulse MWD system as will be explained in greater detail below.

The EM transmission is generated by creating a potential difference across a region of isolation 29 in the drill string 20 and is formed by generating an electromagnetic (EM) field F which propagates outwardly and upwardly through the formation 16 to the surface and creating and transmitting a return signal S through the drill string 20. A conductive member 50, typically an iron stake driven into the formation 16, conducts the formation signal through a data connection 52 to the EM surface system 38 and the return signal is transmitted from the surface station 34 over line 41 to a connection on the drill rig 12. As can be seen in FIG. 1, the negative dipole for the EM signal is provided by a connection to the drill string 20 at a location which is above the region of isolation 29 and the positive dipole for the EM signal is provided by a connection to the drill string 20 at a location which is below the region of isolation 29. It will be appreciated that either signal (formation or drill string) can be the EM signal or the return signal, however the arrangement shown in FIG. 1 is preferred since the drill string 20 typically provides a better reference than the formation 16.

In another embodiment, the MWD tool 30 provided dual telemetry capabilities thus capable of transmitting data to the surface receiver station 34 using either EM telemetry (as discussed above), or mud pulse telemetry by transmitting data through the mud column M by way of a series of pressure pulses. The pressure pulses are received by the pressure transducer, converted to an appropriate compatible signal (e.g. a current signal) which is indicative of the information encoded in the pressure pulses, and transmitted over a data cable directly to the pulse decoder 32 as will be explained in greater detail below.

MWD Tool—Downhole Configuration

Figure 2A:
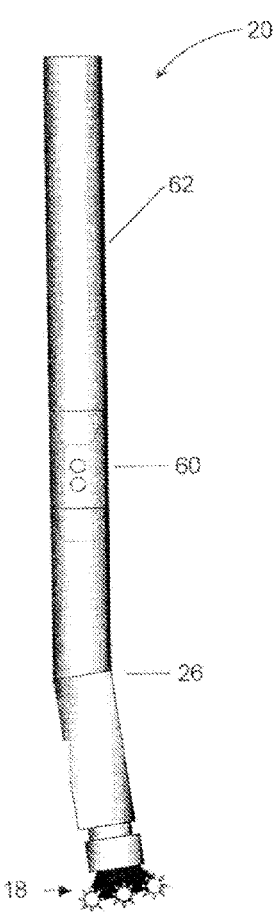
FIG. 2(*a*) is an external plan view of a downhole portion of a mud pulse tool drill string configuration.
Figures 3A, 3B:
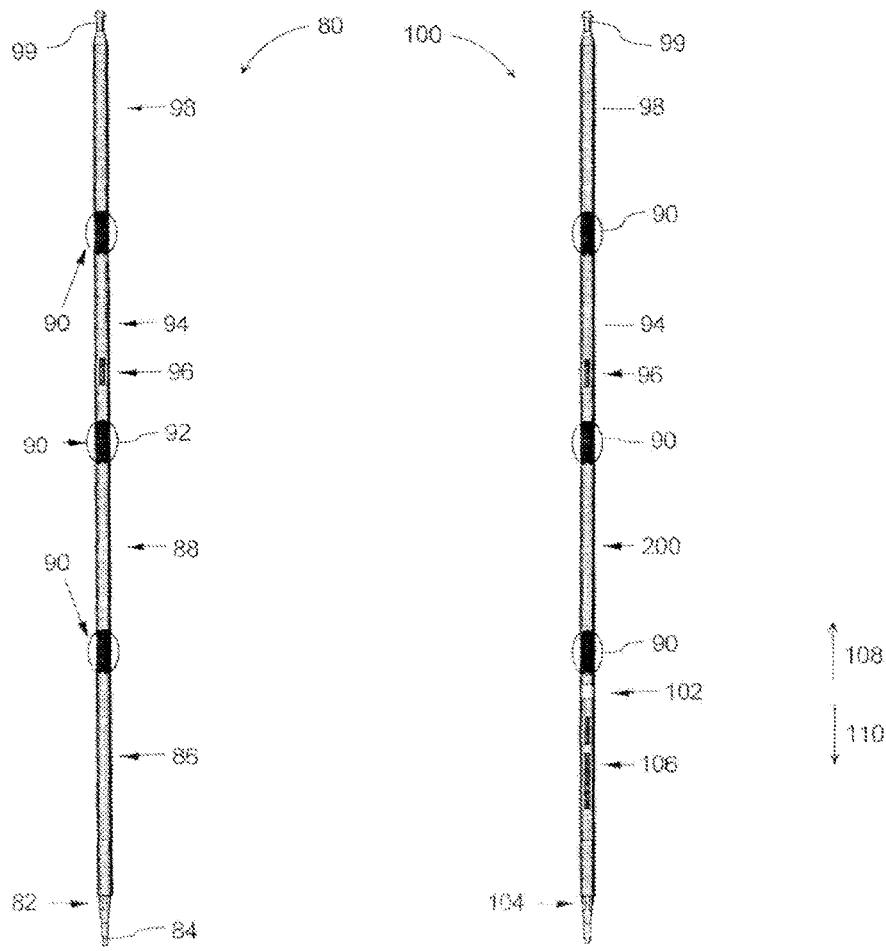
FIG. 3(*a*) is an external plan view of a mud pulse tool string.

Referring to FIG. 2(a), a conventional downhole drill string configuration for a mud pulse MWD tool string 80 is shown (see FIG. 3(a) for pulse tool string 80). An example of such a mud pulse MWD tool is a Tensor™ MWD tool sold by GE Energy™. The conventional mud pulse drill string configuration comprises a drill bit 18 driven by a mud motor 26 connected thereto. Connected to the mud motor 26 is a universal bottom hole offset (UBHO) 60, which internally provides a tool string landing point for the pulse tool string 80. Connected to the UBHO 60 is the serially connected drill rods 20 forming the upstream portion 62 of the drill string 20. The upstream portion 62 of the drill string 20 is typically formed using a few non-magnetic drill rods to provide a non-magnetic spacing between magnetically sensitive equipment and the other drill rods, which can be magnetic.

Figure 2B:
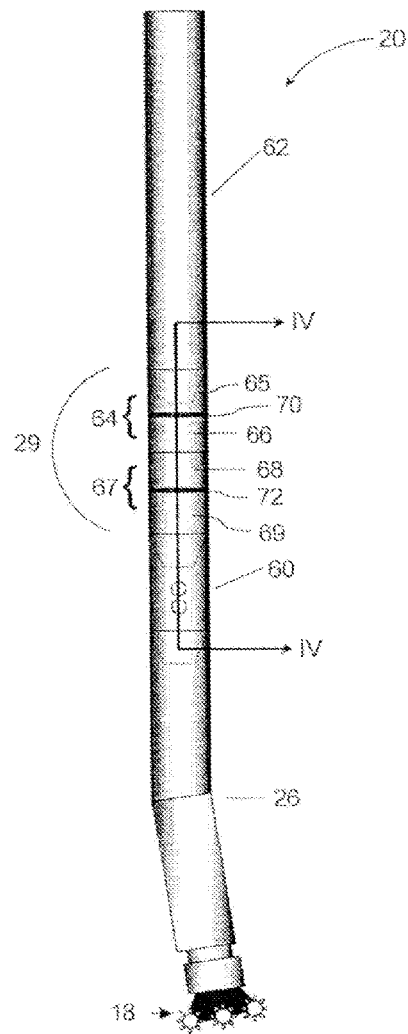

Referring to FIG. 2(b), a downhole drill string configuration for an EM MWD tool string 100 is shown (see FIG. 3(b) for EM tool string 100). It can be seen in FIG. 2(b) that the drill bit 18, mud motor 26 and UBHO 60 are configured in the same way shown in FIG. 2(a), however, interposed between the UBHO 60 and the upstream portion 62 of the drill string 20, is the region of isolation 29. In one embodiment, the region of isolation 29 comprises a first sub-assembly 64 connected to a second sub-assembly 67, wherein the first sub assembly 64 is comprised of a first sub 65 and second sub 66 isolated from each other by a first non-conductive ring 70 and the second sub-assembly 67 is comprised of a third sub 68 and fourth sub 69 isolated from each other by a second non-conductive ring 72. The EM tool string 100 is preferably aligned with the region of isolation 29 such that a tool isolation 102 in the EM tool string 100 is situated between the first and second non-conductive rings 70, 72. However, it can be appreciated that the region of isolation 29 is used to isolate the drill string 20 and thus the tool isolation 102 may be above or below so long as there is a separation between points of contact between the tool string 100 and the drill string 20 as will be discussed below. As will also be discussed below, the EM tool string 100 is configured to interface with the existing UBHO 60 such that the EM tool string 100 can be used with the existing modules in a conventional pulse tool string 80 such as those included in a GE Tensor™ tool.

The pulse tool string 80 is shown in greater detail in FIG. 3(a). The pulse tool string 80 is configured to be positioned within the drill string configuration shown in FIG. 2(a). The pulse tool string 80 comprises a landing bit 82 which is keyed to rotate the pulse tool string 80 about its longitudinal axis into a consistent orientation as it is being landed. The landing bit 82 includes a mud valve 84 that is operated by a mud pulse module 86 connected thereto. In normal pulse telemetry operation, the mud valve 84 is used to create pressure pulses in the mud column M for sending data to the surface. A first battery 88, typically a 28 V battery is connected to the mud pulse module through a module interconnect 90. The module interconnect 90 comprises a pair of bow springs 92 to engage the inner wall of drill string 20 and center the pulse tool string 80 within the drill string 20. The bow springs 92 are flexible to accommodate differently sized bores and are electrically conductive to provide an electrical contact with the drill string 20. The interconnects 90 are typically rigid while accommodating minimal flexure when compared to the rigidity of the tool string 100. Other interconnects (not shown) may be used, which are not conductive, where an electrical contact is not required. such other interconnects are often referred to as "X-fins".

Another module interconnect 90 is used to connect the first battery 88 to a direction and inclination module 94. The direction and inclination module 94 (hereinafter referred to as the "directional module 94") acquires measurement data associated with the drilling operation and provides such data to the pulse module 86 to convert into a series of pressure pulses. Such measurement data may include accelerometer data, magnetometer data, gamma data etc. The directional module 94 comprises a master controller 96 which is responsible for acquiring the data from one or more sensors and creating a voltage signal, which is typically a digital representation of where pressure pulses occur for operating the pulse module 86.

Yet another module interconnect 90 is used to connect a second battery 98, typically another 28 V battery, to the directional module 94. The second battery 98 includes a connector 99 to which a trip line can be attached to permit tripping the tool string 80. The tool string 80 can be removed by running a wireline down the bore of the drill string 20. The wireline includes a latching mechanism that hooks onto the connector 99 (sometimes referred to as a "spearpoint"). Once the wireline is latched to the tool string 80, the tool string 80 can be removed by pulling the wireline through the drill string 20. It will be appreciated that the tool string 80 shown in FIG. 3(a) is only one example and many other arrangements can be used. For example, additional modules may be incorporated and the order of connection may be varied. Other modules may include pressure and gamma modules, which are not typically attached above the second battery 98 but could be. All the modules are designed to be placed anywhere in the tool string 80, with the exception of the pulse module 86 which is located at the bottom in connection with the pulser 84.

Referring now to FIG. 3(b), the EM tool string 100 is shown. The EM tool string 100 is configured to be positioned within the downhole drill string configuration shown in FIG. 2(b). The EM tool string 100 comprises a modified landing bit 104 that is sized and keyed similar to the landing bit 82 in the pulse tool string 80 but does not include the mud valve 84. In this way, the EM tool string 100 can be oriented within the drill string 20 in a manner similar to the pulse tool string 80. In this embodiment, an EM transmitter module 106 is connected to the modified landing bit 104 in place of the mud pulse module 86. The EM transmitter module 106 includes electrical isolation 102 to isolate an upstream EM tool portion 108 from a downstream EM tool portion 110. The electrical isolation 102 can be made from any non-conductive material such as a rubber or plastic. A quick change battery assembly 200 (e.g. providing 14 V) may be used in place of the first battery 88 discussed above, which is connected to the EM transmitter module 106 using a module interconnect 90. It will be appreciated that although the quick change battery assembly 200 is preferable, the first battery 88 described above may alternatively be used. The directional module 94 and second battery 98 are connected in a manner similar to that shown in FIG. 3(a) and thus details of such connections need not be reiterated.

It can therefore be seen that downhole, a conventional pulse tool string 80 can be modified for transmitting EM signals by replacing the landing bit 82 and pulse module 86 with the modified landing bit 104 and EM transmitter module 106 while utilizing the other existing modules. The modified landing bit 104 enables the EM transmitter module 106 to be oriented and aligned as would the conventional pulse module 86 by interfacing with the UBHO 60 in a similar fashion.

Region of Isolation—Gap Sub-Assembly

Figure 4:
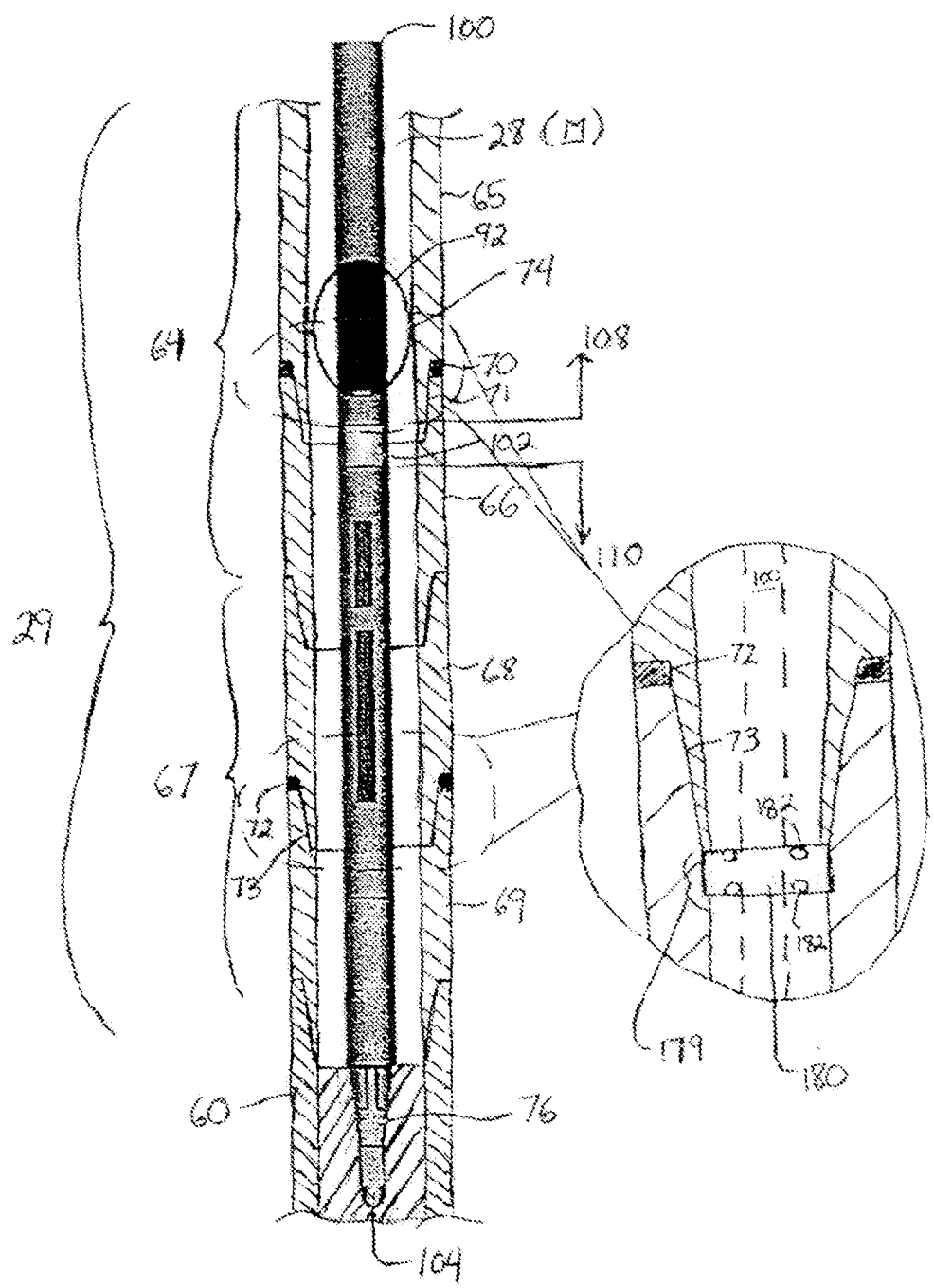
FIG. 4 is a sectional view of a region of isolation in the EM tool string of FIG. 3(*b*) along the line IV-IV showing the EM tool string positioned therein.

The placement of the EM tool string 100 within the conduit 28 of the drill string 20 is shown in greater detail in FIG. 4. As discussed above, the EM tool string 100 is aligned with the region of isolation 29, and the region of isolation 29 comprises a first sub-assembly 64 connected to a second sub-assembly 67, wherein the first sub-assembly 64 comprises first and second subs 65, 66 and the second sub-assembly 67 comprises third and fourth subs 68, 69. As can be seen, the shoulders of the subs 65 and 66 are separated by a non-conductive ring 70, and the threads of the subs 65 and 66 are separated by a non-conductive layer 71. Similarly, the shoulders of the subs 68 and 69 are separated by another non-conductive ring 72, and the threads of the subs 68 and 69 are separated by another non-conductive layer 73. The rings 70 and 72 are made from a suitable non-conductive material such as a ceramic. Preferably, the rings 70 and 72 are made from either Technox™ or YTZP-Hipped™, which are commercially available ceramic materials that possess beneficial characteristics such as high compressive strength and high resistivity. For example, Technox™ 3000 grade ceramic has been shown to exhibit a compressive strength of approximately 290 Kpsi and exhibit a resistivity of approximately $10^9$ Ohm·cm at 25° C.

The subs each have a male end or "pin", and a female end or "box". For constructing the region of isolation 29, the pins and boxes that mate together where the ceramic ring 70, 72 is placed should be manufactured to accommodate the ceramic rings 70, 72 as well as other insulative layers described below. To accommodate the rings 70, 72, the pin end of the subs are machined. Firstly, the shoulder (e.g. see 59 in FIG. 5) is machined back far enough to accommodate the ceramic ring 70, 72. It has been found that using a ½" zirconia ring with a ½" reduction in the shoulder is particularly suitable. The pin includes a thread that may be custom or an API standard. To accommodate the isolation layers 71, 73, the thread is further machined to be deeper than spec to make room for such materials. It has been found that to accommodate the layers 71 and 73 described in detail below, the pins can be machined 0.009" to 0.0010" deeper than spec. The shoulders are machined back to balance the torque applied when connecting the subs that would normally be accommodated by the meeting of the shoulders as two subs come together.

The thread used on the pins is preferably an H90 API connection or an SLH90 API connection due to the preferred 90° thread profile with a relatively course. This is preferred over typical 60° thread profiles. It will be appreciated that the pins can be custom machined to include a course thread and preferably 90° thread profile. To achieve the same effect as the H90 API connection, a taper of between 1.25" and 3" per foot should be used. In this way, even greater flexibility can be achieved in the pin length, diameter and changes throughout the taper.

In one embodiment, the insulative layers 71, 73 comprise the application of a coating, preferably a ceramic coating, to the threads of the pins to isolate subs 65 from sub 66 and sub 68 from sub 69. A suitable coating is made from Aluminium Oxide or Titanium Dioxide. This locks the corresponding subs together to provide complete electrical isolation. When using a ceramic coating, the pin should be pre-treated, preferably to approximately 350° C. Also when applying the ceramic coating, the pin should be in constant rotation and the feed of the applicator gun should be continuous and constant throughout the application process. It will be appreciated that any insulative coating can be applied to the threads. As noted above, the threads are manufactured or modified to accommodate the particular coating that is used, e.g., based on the strength, hardness, etc. of the material used and the clearance needed for an adequate layer of isolation.

In another embodiment, after application of the ceramic coating, a layer of electrical tape or similar thin adhesive layer can be included in the insulative layers 71 and 73 to add protection for the ceramic coating from chipping or cracking from inadvertent collisions. The electrical tape provides a smooth surface to assist in threading the subs together while also providing a layer of cushioning.

The insulative layers 71 and 73 can, in another embodiment, also comprise a cloth or wrapping made from a fabric such as, Vectran, Spectra, Dyneema, any type of Aramid fiber fabric, any type of ballistic fabric, loose weave fabrics, turtle skin weave fabrics to name a few. In general, a material that includes favourable qualities such as high tensile strength at low weight, structural rigidity, low electrical conductivity, high chemical resistance, low thermal shrinkage, high toughness (work-to-break), dimensional stability, and high cut resistance is preferred. In general, the insulative layers 71 and 73 and the rings 70 and 72 provide electrical isolation independent of the material used to construct the subs 65, 66, 68 and 69. However, preferably the subs 65, 66, 68 and 69 are made from a non-magnetic material so as to inhibit interference with the electromagnetic field F.

The insulative layers 71, 73 may further be strengthened with an epoxy type adhesive which serves to seal the sub assemblies 64, 67. In addition to the epoxy adhesive, a relief 179 may be machined into the box of the appropriate subs as seen in the enlarged portion of FIG. 4. The relief 179 is sized to accommodate a flexible washer 180, preferably made from polyurethane with embedded rubber o-rings 182. The washer 180 is placed in the relief such that when the pin is screwed into the box, the outside shoulders 59, 75 (see FIG. 5 also) engage the ceramic ring 70 or 72, an inside shoulder also engages where the washer 180 is seated. The polyurethane is preferably a compressible type, which can add significant safeguards in keeping moisture from seeping into the threads. The addition of the o-rings 182 provides a further defence in case of cracking or deterioration of the polyurethane or similar material in the washer 180. In this way, even if the epoxy seal breaks down, a further layer of protection is provided. This can prolong the life of the region of isolation 29 and can prevent moisture from shorting out the system.

Figure 5:
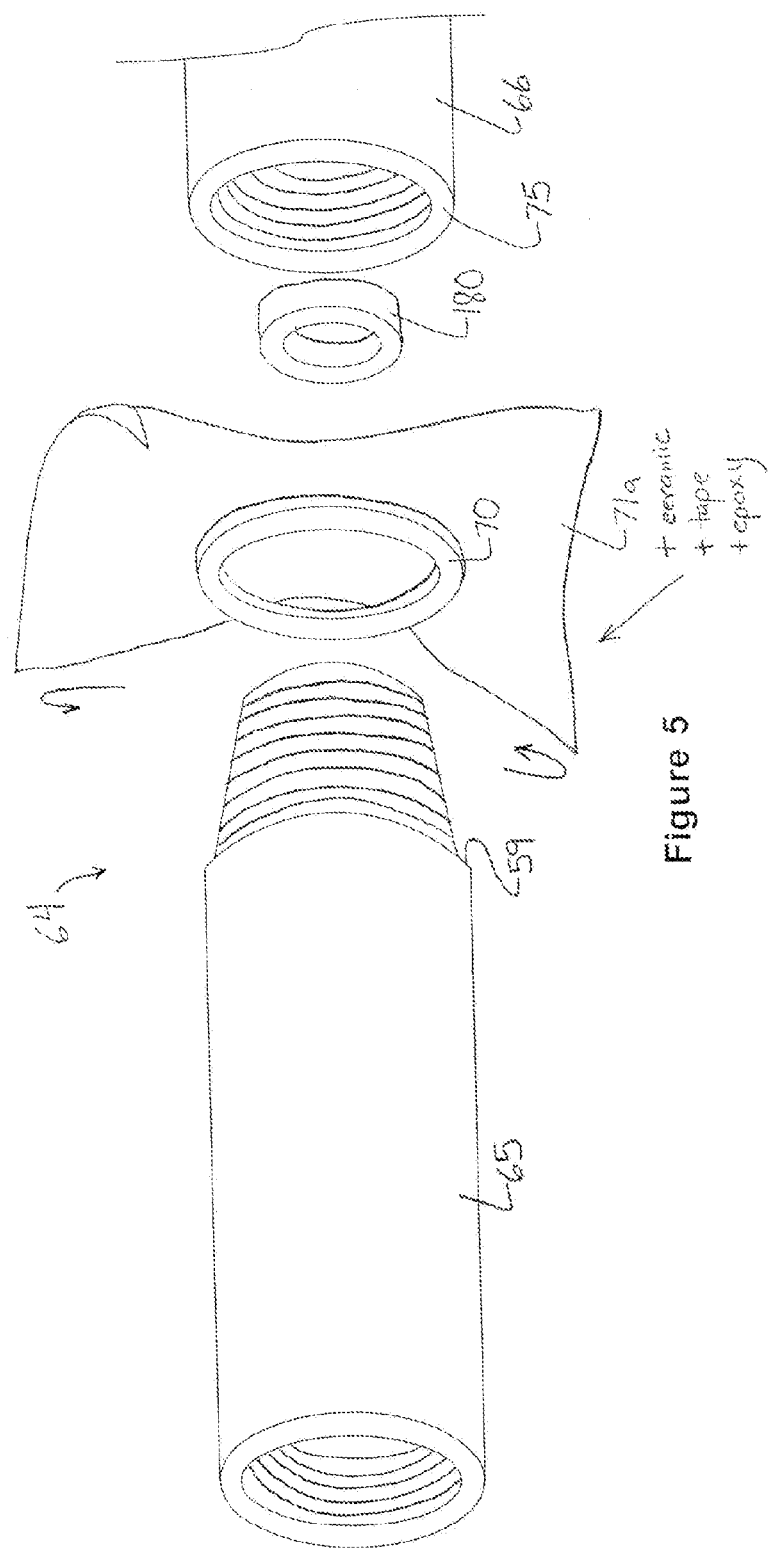
FIG. 5 is an exploded perspective view of a gap sub-assembly.

FIG. 5 illustrates an exploded view of an exemplary embodiment of the first sub-assembly 64 utilizing a ceramic coating and a wrapping of woven fabric in addition to the other insulative layers discussed above. In a preferred assembly method, the sub-assembly 64 is assembled by applying the ceramic coating to the pin of the sub 65 and then applying a layer of electrical tape (not shown). The ceramic ring 70 is then slid over the male-end of the first sub 65 such that it is seated on the shoulder 59. The epoxy may then be added over the electrical tape to provide a moisture barrier. A wax string may also be used if desired. The washer 180 is then inserted into the relief 179. The wrapping 71*a* is then wrapped clockwise around the threads of the pin of the sub 65 over the electrical tape, as the female-end of the second sub 66 is screwed onto the male-end of the first sub 65, until the shoulder 75 engages the ring 70. As the female-end of the second sub 66 is screwed onto the male-end of the first sub 65. In this way, the ring 70 provides electrical isolation between the shoulders 59 and 75, and the cloth 71*a*, ceramic, tape and epoxy provides electrical isolation between the threads. As such, the sub 65 is electrically isolated from the sub 66. It will be appreciated that the second sub-assembly 67 can be assembled in a similar manner.

It will be appreciated that all of the above insulative materials can be used to provide layer 71 as described, as well as any combination of one or more. For example, the ceramic coating may be used on its own or in combination with woven fabric 71*a*. It can be appreciated that each layer provides an additional safeguard in case one of the other layers fails. When more than one insulative material is used in conjunction with each other, the isolation can be considered much stronger and more resilient to environmental effects.

As shown in FIG. 4 (also seen in FIG. 2(b)), the sub-assemblies 64 and 67 are connected together without any electrical isolation therebetween. The upstream tool portion 108 is electrically connected to the drill string 20 at contact point 74 and the downstream tool portion 110 is electrically connected to the drill string 20 at contact point 76 provided by the interface of the modified landing bit 104 and the UBHO 60. It can be seen that the sub-assemblies 64 and 67 should be sized such that when the modified landing bit 76 is seated in the UBHO 60, the tool isolation 102 is between the non-conductive rings 70 and 72 and more importantly, such that the bow springs 92 contact the drill string 20 above the region of isolation 29. This enables the electric field F to be created by creating the positive and negative dipoles.

Power Supply—Quick Change Battery

Figure 6:
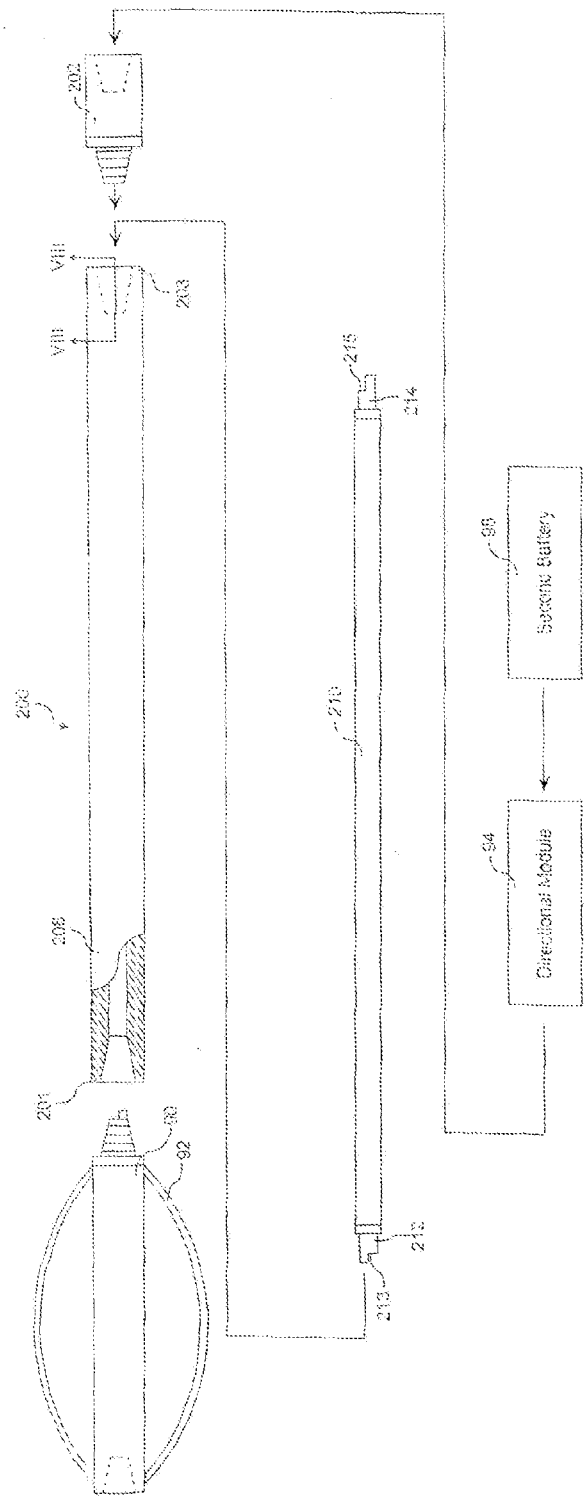
FIG. 6 is an exploded view of a power supply.
Figure 7:
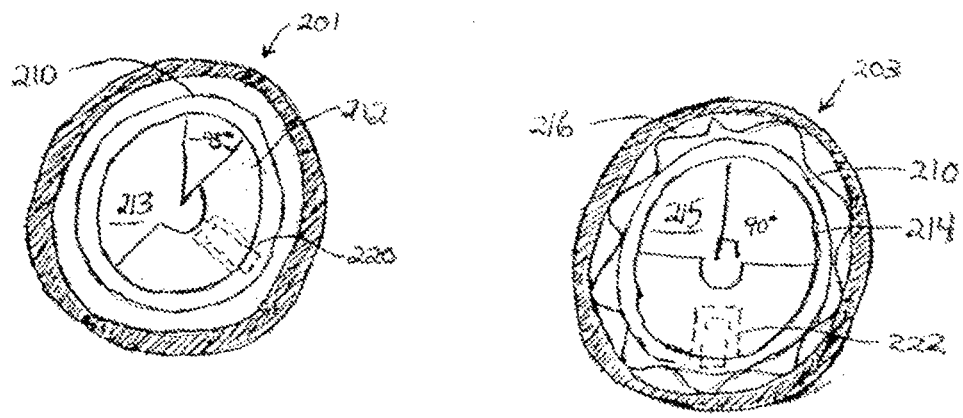
FIG. 7 is a pair of end views of the battery barrel of FIG. 6.
Figure 8:
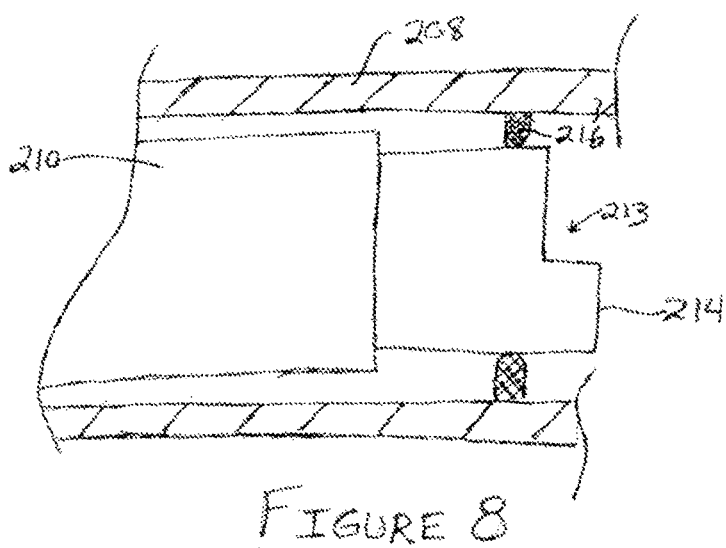
FIG. 8 is a sectional view along the line VIII-VIII shown in FIG. 6.

As discussed above, the EM tool string 100 may include a quick change battery assembly 200. The quick change battery assembly 200 can provide 14V or can be configured to provide any other voltage by adding or removing battery cells. Preferably, the quick change battery assembly 200 is connected to the other modules in the EM tool string 100 as shown in FIGS. 6-8. Referring first to FIG. 6, an exploded view is provided showing the connections between the battery assembly 200 and the EM module 104 using module interconnect 90. In the example shown, the battery assembly 200 includes a battery barrel 208 that is connected directly to the module interconnect 90 at one end 201 and thus the end 201 includes a similar interconnection. A bulkhead 202 is connected to the other end 203 of the battery barrel 208 to configure the end 203 for connection to the module interconnect 90 attached further upstream of the directional module 94. Typically, another battery assembly 98 is in turn connected to the directional module 94 as discussed above.

The battery barrel 208 houses a battery 210. The battery 210 includes a number of battery cells. It will be appreciated that the barrel 208 can be increased in length to accommodate longer batteries 210 having a greater number of cells. The battery 210 in this example includes a lower 45 degree connector 212 and an upper 90 degree connector 214. The lower connector 212 preferably includes a notch 213, which is oriented 45 degrees from the orientation of a notch 215 in the upper connector 214. The notches 213 and 215 are shown in greater detail in FIG. 7. The notches 213 and 215 are different from each other so as to be distinguishable from each other when the battery 210 is installed and thus minimize human error during assembly. As can be seen in FIG. 7, the notches 213 and 215 are generally aligned with respective retention mechanisms 220 and 222. The mechanisms 220 and 222 are preferably pin assemblies that maintain the position of the battery 210 in the barrel 208.

The upper end 214 of the battery 210 is preferably centered in the barrel 208 using a bushing 216, as shown in FIGS. 7 and 8 (wavy line in FIG. 7). The bushing 216 is arranged along the inside of the barrel 208 at end 203 and situates the upper connector 214 to inhibit movement and potential cracking of the battery casing.

The battery 210 can be changed in the field either by removing the battery barrel 208 from the EM module 104 and the directional module 94 or, preferably, by disconnecting the directional module 94 from the bulkhead 202 (which disconnects the upper connector 214); disconnecting the lower connector 212 from the EM module 104 by pulling the battery 210 from the barrel 208 and bulkhead 202; replacing the battery 210 with a new battery; and reassembling the EM module 104, barrel 208 and directional module 94. Since the upper connector 214 and lower connector 212 are visually different, the nature of the battery 210 should assist the operator in placing the battery 210 in the barrel 208 in the correct orientation. Similarly, since, in this example, only the end 203 connects to a bulkhead 202, if the entire battery assembly 200 is removed, the ends 201, 203 should be obviously distinguishable to the operator.

It can therefore be seen that the battery 210 can be readily removed from the barrel 208 when a new battery is to replace it. The arrangement shown in FIGS. 6-8 thus enables a "quick change" procedure to minimize the time required to change the battery 210, which can often be required in poor environmental conditions. It can be appreciated that minimizing downtime increases productivity, which is also desirable.

MWD Tool—First Embodiment

Figure 9:
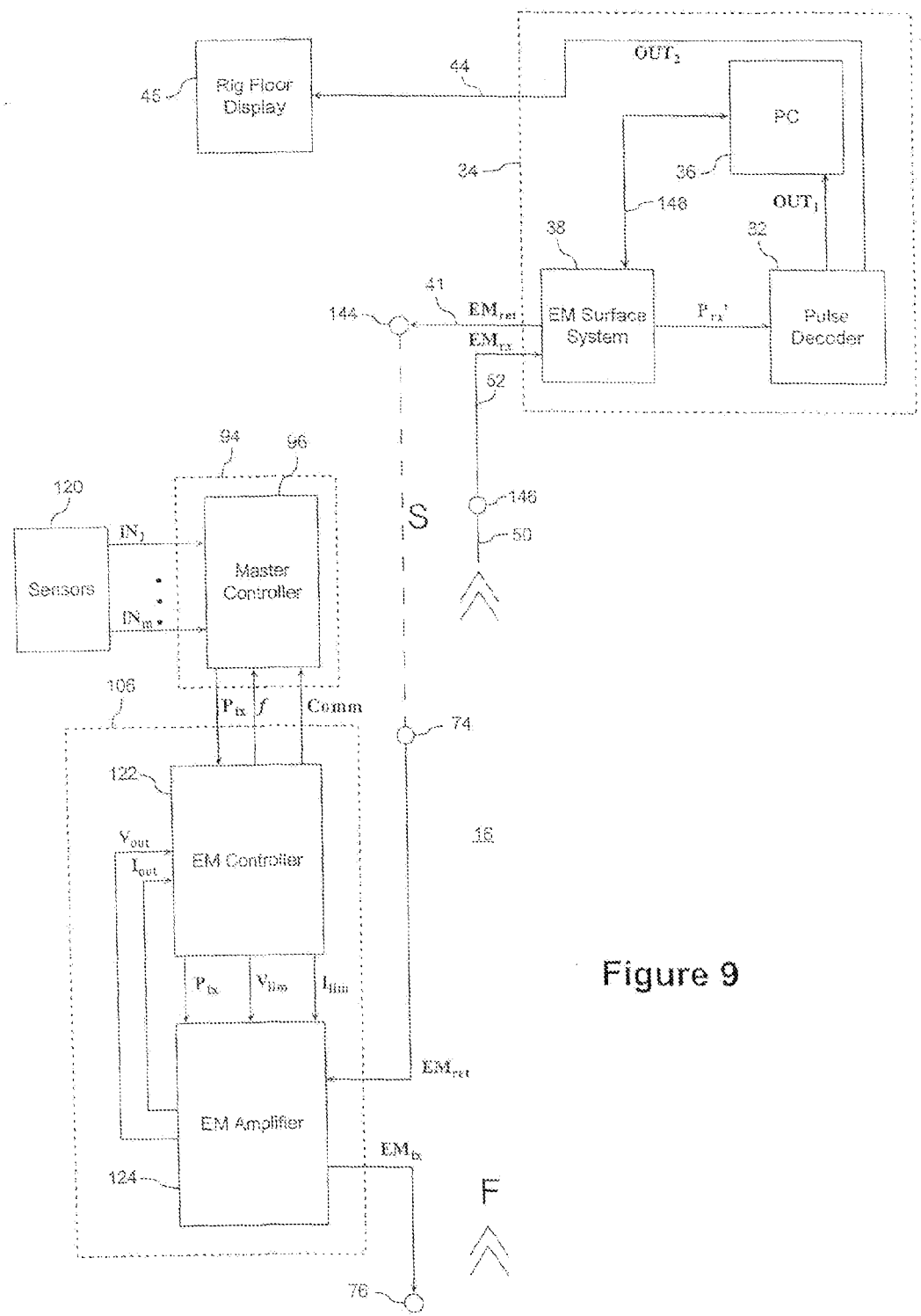
FIG. 9 is a schematic diagram showing data flow from a directional module to a surface station via an EM transmitter module in an EM MWD system.

A schematic diagram showing data flow in one embodiment, from a series of downhole sensor 120 to the surface station 34 using the EM tool string 100 is shown in FIG. 9. The sensors 120 acquire measurements for particular downhole operating parameters and communicate the measurements to the master controller 96 in the directional module 94 by sending an arbitrary m number of inputs labelled $IN_1$, $IN_2$, . . . , $IN_m$ from an arbitrary m number of sensors 120. The master controller 96 is part of an existing pulse MWD module, namely the directional module 94, as discussed above. The master controller 96 generates and outputs a pulse transmission signal labelled $P_{tx}$ which is an encoded voltage pulse signal.

Generally, encoding transforms the original digital data signal into a new sequence of coded symbols. Encoding introduces a structured dependency among the coded symbols with the aim to significantly improve the communication performance compared to transmitting uncoded data. In one scheme, M-ary encoding is used (e.g. in the GE Tensor™ tool), where M represents the number of symbol alternatives used in the particular encoding scheme.

The encoded data is then modulated, where, modulation is a step of signal selection which converts the data from a sequence of coded symbols (from encoding) to a sequence of transmitted signal alternatives. In each time interval, a particular signal alternative is sent that corresponds to a particular portion of the data sequence. For example, in a binary transmission, where two different symbols are used, the symbol representing a "high" or "1", will be sent for every "1" in the sequence of binary data. In the result, a waveform is created that carries the original analog data in a binary waveform. Where M is greater than 2, the number of symbol alternatives will be greater and the modulated signal will therefore be able to represent a greater amount data in a similar transmission.

M-ary encoding typically involves breaking up any data word into combinations of two (2) and three (3) bit symbols, each encoded by locating a single pulse in one-of-four or one-of-eight possible time slots. For example, a value 221 encodes in M-ary as 3, 3, 5. The 3, 3, 5 sequence comes from the binary representation of 221, which is 11|011|101. In this way, the first 3 comes from the 2-bit symbol 11, the second 3 comes from the 3-bit symbol 011, and the 5 comes from the 3-bit symbol 101.

It can be appreciated that different directional modules 94 may use different encoding schemes, which would require different decoding schemes. As will be explained below, the EM transmitter module 106 is configured to intercept and redirect an amplified version of $P_{tx}$ such that the EM transmitter module 106 is compatible with any directional module 94 using any encoding scheme. In this way, the EM transmitter module 106 does not require reprogramming to be able to adapt to other types of directional modules 94. This provides a versatile module that can be interchanged with different mud pulse systems with minimum effort.

The output $P_{tx}$ is a modulated voltage pulse signal. The modulated signal is intended to be used by the pulse module 86 to generate a sequence of pressure pulses according to the modulation scheme used. However, in the embodiment shown in FIG. 9, the EM transmitter module 106 intercepts the modulated voltage signal. The EM transmitter module 106 includes an EM controller module 122 and an EM amplifier module 124. The controller module 122 intercepts $P_{tx}$ and also outputs a flow control signal f and communication signal Comm. The flow control signal f is used to determine when "flow" is occurring in the drilling mud. Ultimately, when fluid is being pumped downhole ("flow on" condition), drilling has commenced and data is required to be transmitted to the surface. Although EM telemetry does not require "flow" in the drilling mud to be operational, existing directional modules 94 are designed to work with pulse modules 86. As such, existing directional modules 94 require flow in order to operate since pressure pulses cannot be created in a static fluid column M. Moreover, when flow stops, the drill string 20 and the MWD tool 30 become "stable" and allow other more sensitive measurements to be acquired (e.g. accelerometer and magnetometer data), stored and transmitted on the next "flow on" event.

The flow control signal f in the EM controller module 122 is used to instruct the master controller 96 when a consistent vibration has been sensed by the vibration switch 128. The master controller 96 may then use the flow signal f to activate its internal "flow on" status. The Comm signal is used to allow communication between the EM controller module 122 and the master controller 96. Such communication allows the EM controller module 122 to retrieve operational information that the MWD operator has programmed into the master controller 96 before the job has commenced, e.g. current limit values.

Figure 10:
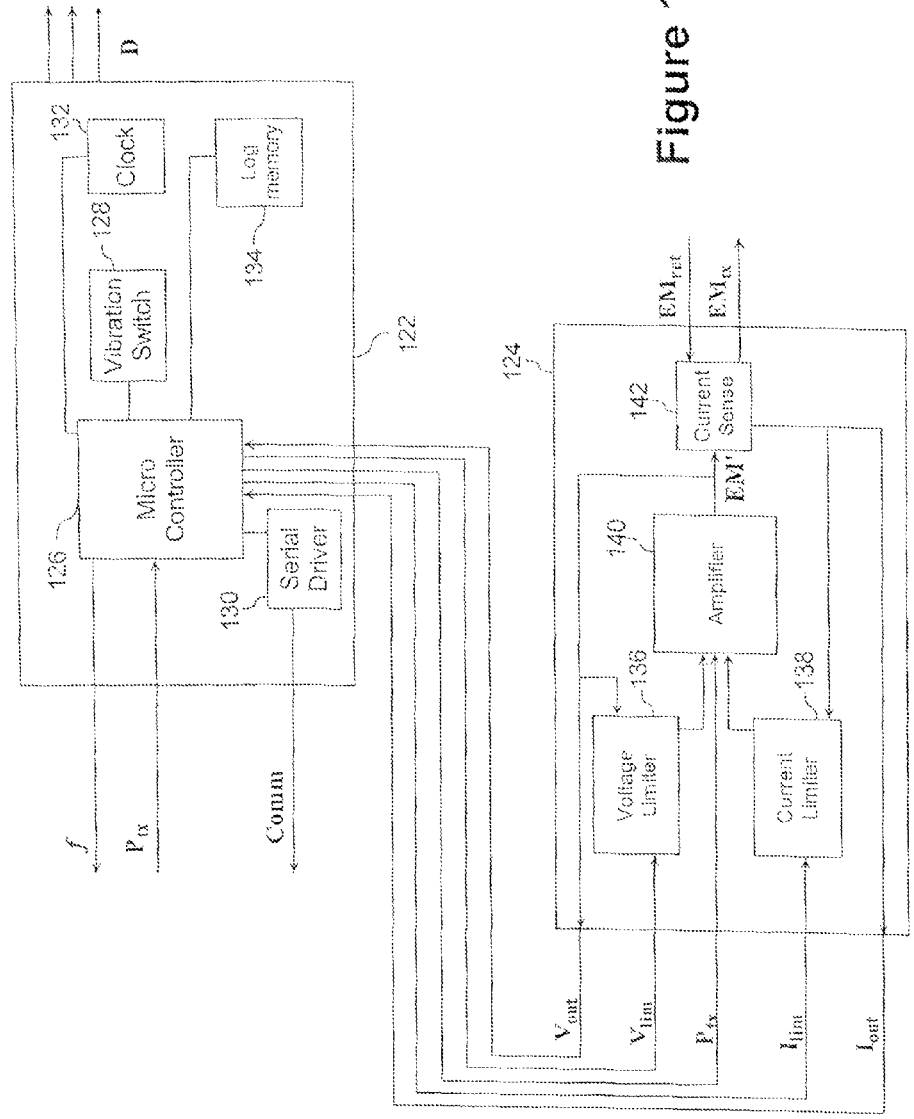
FIG. 10 is a schematic diagram of the EM transmitter module shown in FIG. 9.

The EM controller module 120 and EM amplifier module 122 are shown in greater detail in FIG. 10. The controller module 120 comprises a microcontroller 126, which receives the encoded $P_{tx}$ signal, and generates the flow control signal f. The flow signal f is generated in response to an output from a vibration switch 128 connected to the microcontroller 126. The vibration switch 128 responds to vibrations in the drill string 20 generated by mud flow, which is generated by a mud pump included in the surface drilling equipment 22. The microcontroller 126 also communicates with a serial driver 130 to generate the Comm signal. In a GE Tensor™ tool, the Comm signal is referred to as the Qbus.

Optionally, the controller module 120 may also include a clock 132 for time stamping information when such information is stored in the EM controller module log memory 134. This enables events stored in the logging memory 134 to be correlated to events stored in memory in the master controller 96 or events that occur on the surface, once the memory is downloaded. The EM controller module 122 is thus capable of logging its own operational information (e.g. current limits, resets etc.) and can log information it receives via the Comm line connected to the master controller 96 (e.g. mode changes).

A data connection D may also be provided for communicating between the EM controller module 122 and an optional EM receiver (not shown) that can be included in the EM transmitter module 106. This can be implemented for providing bi-directional communication allowing the EM transmitter module 106 to receive commands/information from the surface system 34 via EM signals and relay the information to the EM controller module 122.

The microcontroller 126 passes the encoded pulse signal $P_{tx}$ to the EM amplifier module 124. The microcontroller 126 also outputs voltage and current limit signals $V_{lim}$ and $I_{lim}$ respectively that are used by the amplifier module 124 to control a voltage limiter 136 and a current limiter 138 respectively. The EM signal is fed into an amplifier 140 in the amplifier module 124 in order to repeat an amplified version of the $P_{tx}$ signal in an EM transmission to the surface.

A current sense module 142 is also provided, which senses the current in the EM signal that is to be transmitted, namely $EM_{tx}$ as feedback for the current limiter and to generate a current output signal $I_{out}$ for the controller module 122. The amplified EM signal labelled EM' is monitored by the voltage limiter 136 and output as $V_{out}$ to the controller module 122. As can be seen in FIG. 9, a connection point 74 above the isolation 102 provides a conductive point for return signal $EM_{ret}$, and $EM_{tx}$ is sent to a connection 76 in the UBHO 60, which as shown in FIG. 3(b) is naturally below the isolation 102.

The EM transmit signal $EM_{tx}$ is the actual EM transmission, and is sent through the formation 16 to the surface. The EM return signal $EM_{ret}$ is the return path for the EM transmission along path S through connection 144. It will be appreciated that either signal ($EM_{tx}$ or $EM_{ret}$) can be the signal or the return, however the arrangement shown in FIG. 9 is preferred since the drill string 20 typically provides a better reference than the formation 16. $EM_{tx}$ propagates through the formation as a result of creation of the positive and negative dipoles created by the potential difference across the connections 74 and 76, which creates the electric field F. The ground stake 50 conducts the EM signal and propagates a received signal $EM_{rx}$ along line 52 to the surface station 34.

Figure 11:
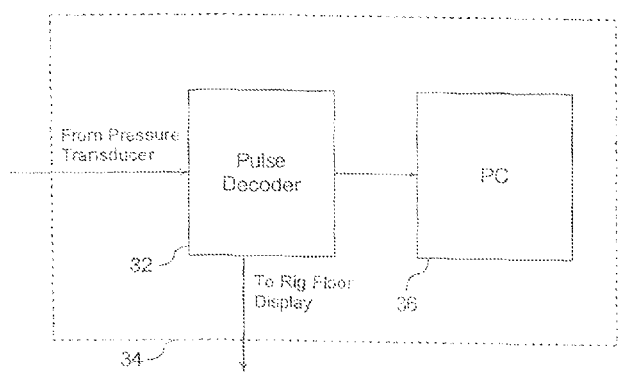
FIG. 11 is a schematic diagram of a surface station utilizing a conventional pulse telemetry system.

The surface station 34, when using conventional mud pulse telemetry may include the components shown in FIG. 11. A mud pulse signal which propagates up through the drilling mud M is received and interpreted by a pressure transducer, which sends a current signal to the pulse decoder 32. The pulse decoder 32 then decodes the current signal and generates an output to send to the PC 36 for the user to interpret, which may also be sent to the rig floor display 45. As can be seen in FIG. 9, where the conventional mud pulse system is adapted to transmit using EM telemetry, the EM surface system 38 intercepts the incoming EM signal $EM_{rx}$ and generates an emulated received pulse signal labelled $P_{rx}'$. The emulated pulse signal $P_{rx}'$ is generated such that the pulse decoder 32 cannot distinguish between it and a normal received pulse signal $P_{rx}$. In this way, the pulse decoder 32 can be used as would be usual, in order to generate an output $OUT_1$ for the PC 36, output $OUT_2$ for the rig floor display 45.

The PC 36 is generally used only for interfacing with the system, e.g. programming the MWD toolstring 100 and pulse decoder 32, and to mimic the rig floor display 45 so that the operator and directional driller can see in the surface station 34 what is seen on the rig 10 without leaving the station 34. Optionally, an interface connection 148 may be provided between the PC 36 and the EM surface system 38 for controlling parameters thereof and to communicate downhole as discussed above. The operator may thus use the PC 36 to interface with the EM surface system 38 and send changes in the operational configuration by way of another EM signal (not shown), which may or may not be encoded in the same way as the master controller 96, downhole via $EM_{ret}$ and $EM_{rx}/EM_{tx}$. The EM receiver would then receive, decode and communicate configuration changes to the EM controller module 122. The EM receiver module would thus be in communication with $EM_{ret}$ and $EM_{tx}$ downhole.

Figure 12:
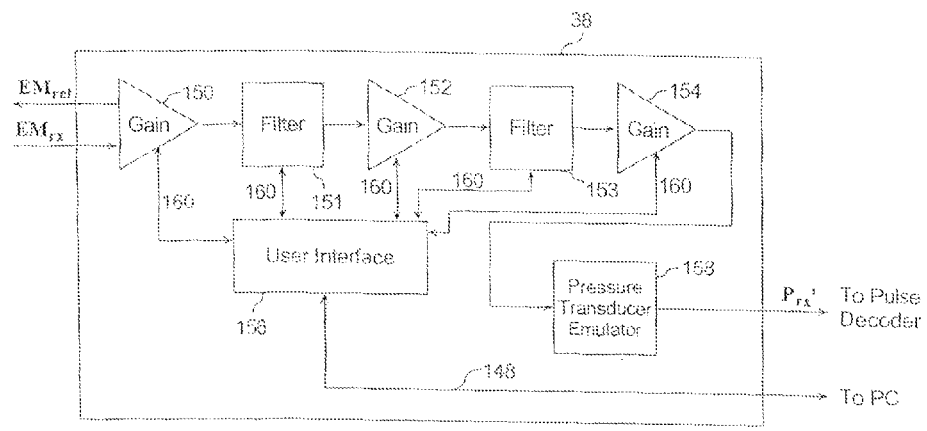
FIG. 12 is a schematic diagram of the EM surface system shown in FIG. 9.

The EM surface system 38 is shown in greater detail in FIG. 12. The received EM signal $EM_{rx}$ is fed into a first gain amplifier 150 with the return signal $EM_{ret}$ also connected to the amplifier 150 in order to provide a ground reference for the EM signal $EM_{rx}$. The amplifier 150 measures the potential difference of the received EM signal $EM_{rx}$ and the ground reference provided by the return signal $EM_{ret}$ and outputs a referenced signal. The referenced signal is then filtered at a first filtering stage 151. The first filtering stage 151 may employ a band reject filter, low pass filter, high pass filter etc. The filtered signal is then fed into a second gain amplifier 152 to further amplify the signal, which in turn is fed into a second filtering stage 153. The second filtering stage 153 can be used to filter out components that have not already been filtered in the first filtering stage 151. The filtered signal is then fed to a third gain amplifier 154 in order to perform a final amplification of the signal. It will be appreciated that the number of filtering and amplification stages shown in FIG. 12 are for illustrative purposes only and that any number may be used in order to provide a conditioned signal. The signal is then fed into a pressure transducer emulator 158, which converts the filtered and amplified voltage signal into a current signal thus creating emulated pulse signal $P_{rx}'$. The emulated pulse signal $P_{rx}'$ is then output to the pulse decoder 32.

It can be seen in FIG. 12 that the filtering and amplification stages 150-154 each include a control signal 160 connected to a user interface port 156. The user interface port 156 communicates with the PC 36 enabling the user to adjust the gain factors and filter parameters (e.g. cut off frequencies). It will be appreciated that rather than employing connection 148 to the PC 36, the EM surface system 38 may instead have its own user interface such as a display and input mechanism to enable a user to adjust the gain and frequency parameters directly from the EM surface system 38.

Exemplary Data Transmission Scheme—First Embodiment

Figure 13:
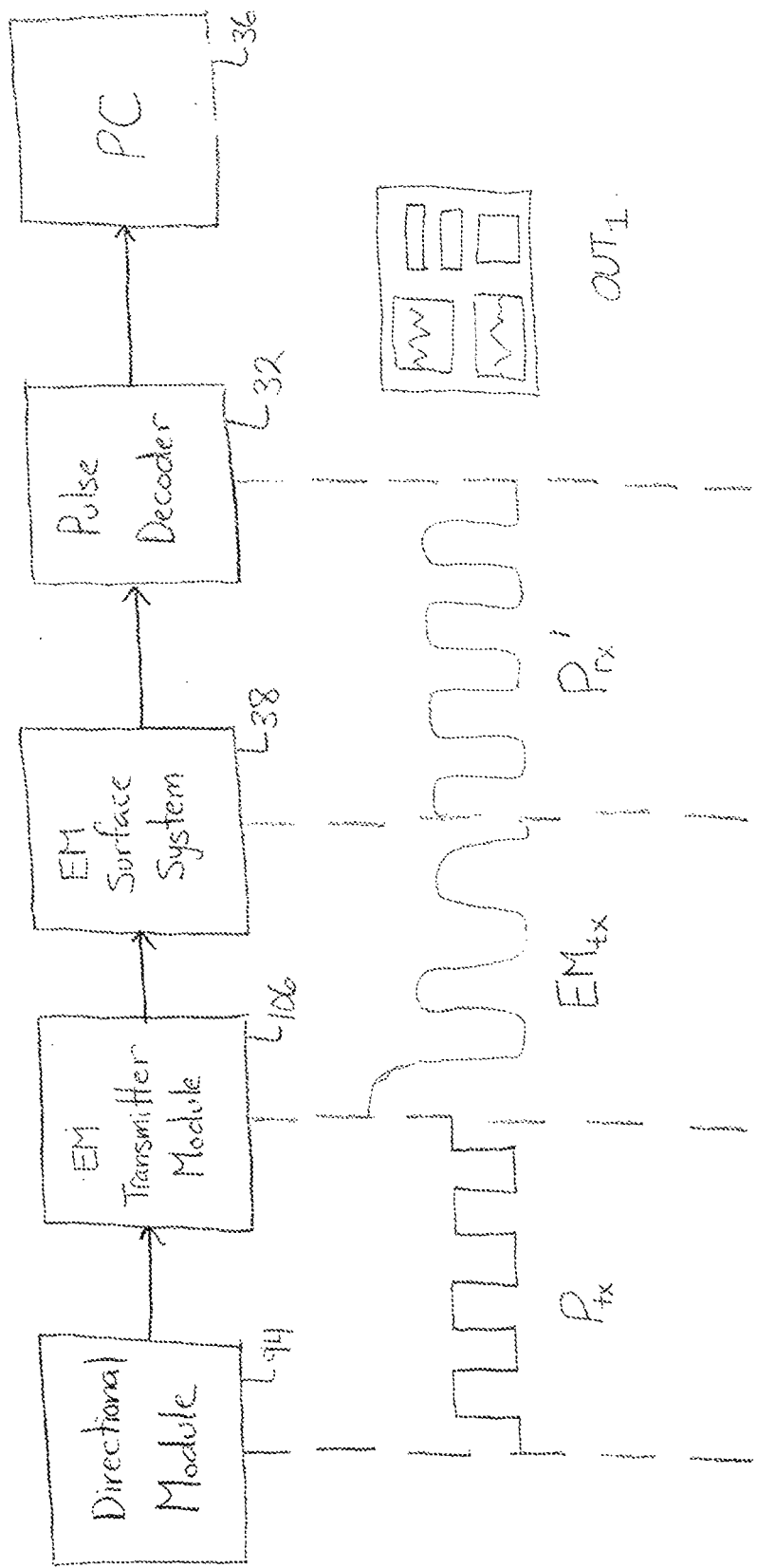
FIG. 13 is a plot showing signal propagation according to the arrangement shown in FIG. 9.
Figure 14:
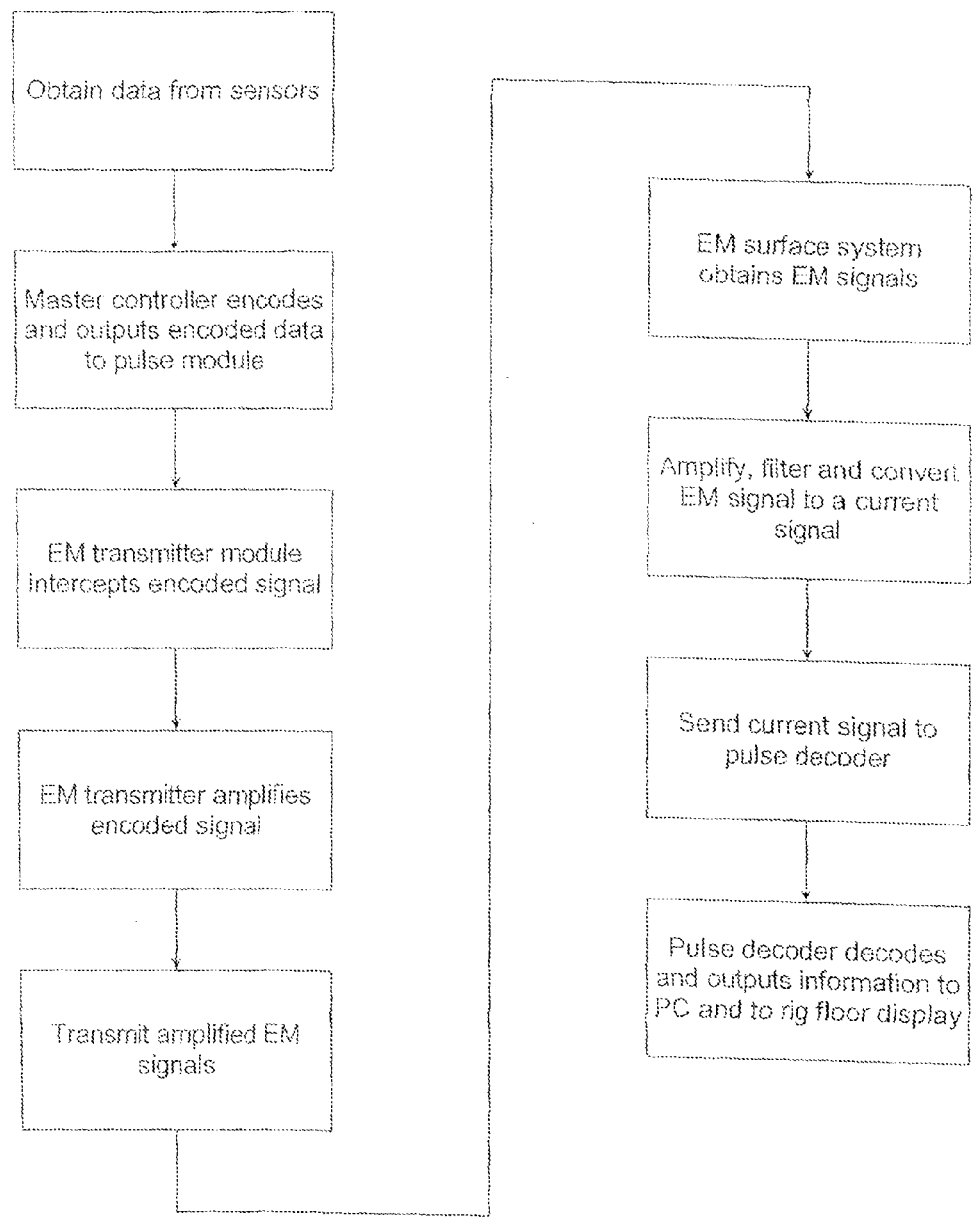
FIG. 14 is a flow diagram illustrating an EM data transmission in the EM MWD system shown in FIG. 9.

Referring now to FIGS. 13 and 14, an example data transmission scheme for the embodiment shown in FIGS. 9-12 will now be explained. Measurements are first obtained by one or more of the sensors 120, typically while the equipment 22 is drilling. Measurements can be obtained from many types of sensors, e.g. accelerometers, magnetometers, gamma, etc. As discussed above, the sensors 120 feed data signals $IN_1, IN_2, \ldots, IN_m$ to the master controller 96 in the directional module 94. The master controller 96 encodes the data using its predefined encoding scheme. As mentioned above, a GE Tensor™ tool typically utilizes M-ary encoding. Other pulse tools may use a different type of encoding. The encoded pulse signal $P_{tx}$ is then output by the master controller 96. As discussed above, EM controller 122 is compatible with any type of encoding scheme and is not dependent on such encoding. As such, the EM transmitter module 106 can be used with any type of pulse system without requiring additional programming.

The pulse signal $P_{tx}$ is intended to be sent to the pulse module 86 but is intercepted by the EM transmitter module 106. Regardless of the encoding scheme being used, the microcontroller 126 obtains and redirects the pulse signal $P_{tx}$ to the EM amplifier module 124. The microcontroller 126 does not decode or have to interpret the pulse signal $P_{tx}$ in any way and only redirects the signal to the amplifier module 124. The amplifier 140 amplifies the $P_{tx}$ signal to create amplified EM signal EM', which is transmitted from the EM transmitter module 106 as EM signal $EM_{tx}$ with a return path being provided for return signal $EM_{ret}$.

During operation, the amplified signal EM' is fed through the current sense module 142 to continuously obtain a current reading for the signal. This current reading is fed back to the current limiter 138 so that the current limiter 138 can determine if the amplifier 140 should be adjusted to achieve a desired current. The current and voltage limit and amplification factor are largely dependent on the type of battery being used and thus will vary according to the equipment available. The voltage of the amplified signal is also monitored by the voltage limiter 136 to determine if the amplifier 140 should be adjusted to achieve a desired voltage. The microcontroller 126 also monitors the amplified output voltage $V_{out}$ and amplified output current $I_{out}$ to adjust the voltage limit $V_{lim}$ and current limit $I_{lim}$ signals.

The limits are typically adjusted according to predetermined parameters associated with the directional module 94 which are used in order to increase or decrease signal strength for different formations and are changed downhole by instructing the master controller 96 with different modes. The EM controller module 122 is used to communicate with the master controller 96 as discussed above, to determine the active mode and to set the current limit accordingly. Typically, the current limit is set as low as possible for as long as possible to save on power consumption, however, this factor is largely dependent on transmission capabilities through the formation and the available battery power.

During operation, the microcontroller 126 also generates the flow signal f and Comm signal to indicate when flow is detected and to effect communication with the master controller 96.

The transmitted EM signal is received at the EM surface system 38 as $EM_{rx}$ and the signal returned via $EM_{ret}$. These signals are typically in the milli-volt to micro-volt range, which is largely dependent on the depth of the down hole antenna and the formation resistance. The potential difference of these signals is then measured by the first amplifier 150 and a combined signal amplified and filtered to compensate for attenuation and altering caused by the formation. The amplified and filtered signal is then fed into the pressure transducer emulator 158 to convert the voltage pulse sent via EM telemetry, into a current signal. It has been found that for a GE Tensor™ pulse decoder 32, a current signal in the range of 4-20 mA is sufficient to mimic the pulse signal $P_{rx}$ normally sent by a pressure transducer. This conversion ensures that the emulated pulse signal $P_{rx}'$ is compatible with the pulse decoder 32. This avoids having to create new software and interfaces while enabling the user to utilize EM telemetry with existing directional modules.

The emulated current signal $P_{rx}'$ is then fed into the pulse decoder 32. The pulse decoder 32 then decodes and outputs the information carried in the encoded signal to the PC 36 enabling the user in the surface station 34 to monitor the downhole parameters. Another output can also be transmitted simultaneously via line 44 to the rig floor display 45 to enable the drilling equipment operators to also monitor the downhole conditions. FIG. 13 shows an exemplary signal plot at the various stages discussed above.

Mode changes can be executed in the downhole tool string by communicating from the surface system to the downhole tool string. Some forms of communication can include, but are not limited to, downlinking and EM transmissions. Downlinking is only one common form of communication, in particular for a GE Tensor™ tool, for changing between pre-configured modes in the master controller 96. Downlinking can be performed by alternating flow on and flow off (pumps on, pumps off) at the surface, with specific timing intervals, where certain intervals correlate to different modes. The flow on and flow off events are detected by the vibration switch 138 on the EM controller module 122 and in turn the flow signal f is toggled accordingly. This is then interpreted by the master controller 96, which is always monitoring the flow line f for a downlink. Once a downlink has occurred, depending on the timing interval, the master controller 96 changes to the desired mode. The EM controller module 122 communicates via the Comm line to the master controller 96 to determine the correct mode, and adjusts its own settings accordingly (e.g. pulse/EM operation—dual telemetry discussed below, current limit, etc.). The surface system 38 is also watching for the flow events and changes its operating mode to match the downhole situation.

The MWD tool 30 shown in FIGS. 9-12 enables a driller to upgrade or add EM capabilities to existing mud-pulse systems. When switching between telemetry modes in a single telemetry embodiment, only the pulse module 86 and landing bit 82 needs to be removed downhole (along with batteries as required), and a connection swapped at the surface station 34. The connection would be at the pulse decoder 32, namely where a pressure transducer would normally be connected to the pulse decoder 32. In order to switch the downhole components between mud-pulse telemetry and EM telemetry, the drill string 20 could be tripped, however, switching at the surface can be effected off-site by simply swapping connectors at the pulse decoder 32 and there would be no need to access the rig 10 or drilling equipment 22 in order to make such a change. The pressure transducer can thus remain installed in the rig 10 whether EM or mud-pulse telemetry is used. Of course, a wireline could instead be used rather than tripping the entire drill string 20 to add further efficiencies.

It may be noted that when a switch between telemetry modes is made between shifts, i.e. when the string 20 is to be tripped anyhow, the driller will not likely be unduly inconvenienced. The quick change battery 200 can also be used to save time since it can be swapped in an efficient manner.

MWD Tool—Second Embodiment

In another embodiment, shown in FIGS. 15-20, the MWD tool 30 is adapted to offer dual telemetry capabilities, in particular, to accommodate both an EM telemetry mode and mud-pulse telemetry mode without tripping either or both of the tool string and drill string. It will be appreciated that in the following description, like elements will be given like numerals, and modified ones of the elements described above will be given like numerals with the suffix "a" to denote modules and components that are modified for the second embodiment.

Figure 15:
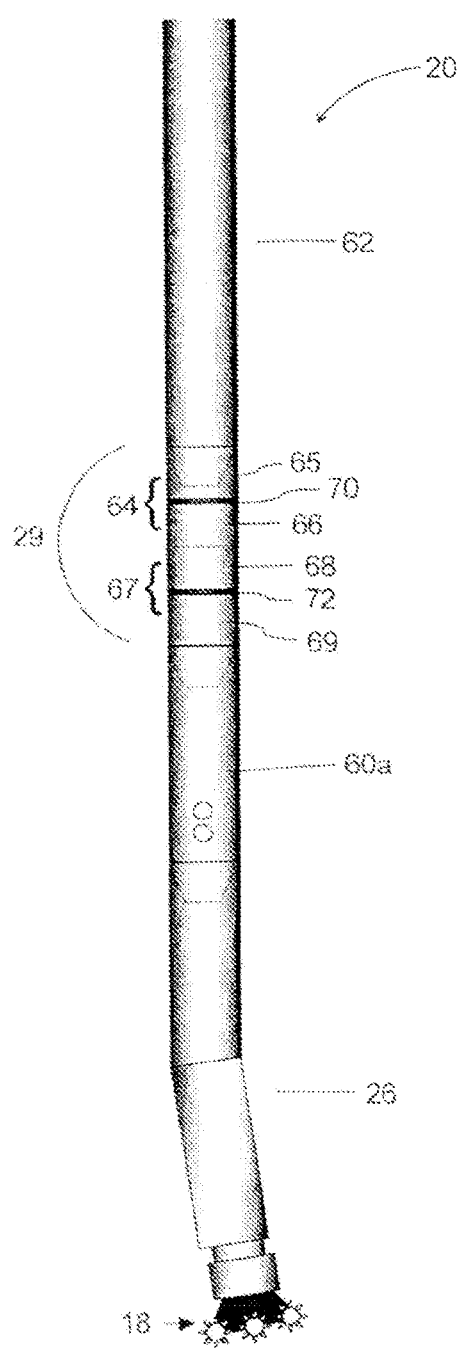
FIG. 15 is an external plan view of a downhole portion of an EM and pulse dual telemetry tool drill string configuration.
Figure 16:
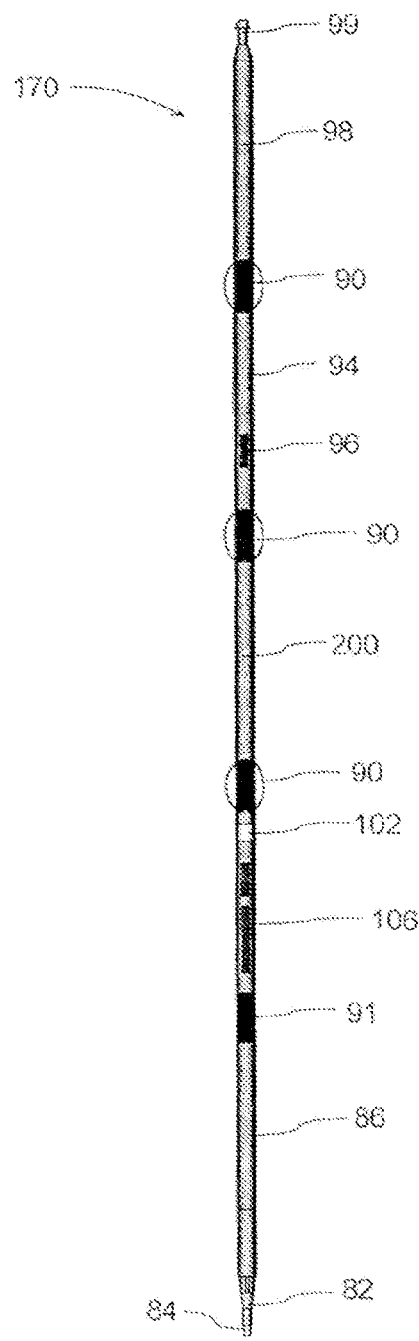
FIG. 16 is an external plan view of an EM and pulse dual telemetry tool string.

Referring first to FIG. 15, a downhole drill string configuration for the second embodiment is shown. As can been seen, the drill bit 18 and mud motor 26 are unchanged, as well as the upstream portion 62 of the drill string 20 and the region of isolation 29. In order to accommodate both the EM transmitter module 106 and the pulse module 86 in a dual telemetry tool string 170, an elongated, modified UBHO 60a is used. The modified UBHO 60a compensates for the increased distance between where the tool string 170 lands and where the isolation 102 is in alignment with the region of isolation 29. As shown in FIG. 16, the dual telemetry tool string 170 includes the traditional landing bit 82 with the pressure valve 84, which is connected to the pulse module 86. A modified interconnect 91 is then used to connect the EM transmitter module 106 to above the pulse module 86. Upstream from the EM transmitter module 106 is the same as shown in FIG. 3(b) and thus the details of which need not be reiterated.

Referring to both FIG. 15 and FIG. 16, it can be seen that in the dual telemetry tool string 170, the EM transmitter module 106 is spaced further from the landing point and the traditional pulse landing bit 82 is used. Similar to the EM tool string 100, existing mud pulse modules can be used with the EM modules to create a dual telemetry MWD tool 30.

Figure 17:
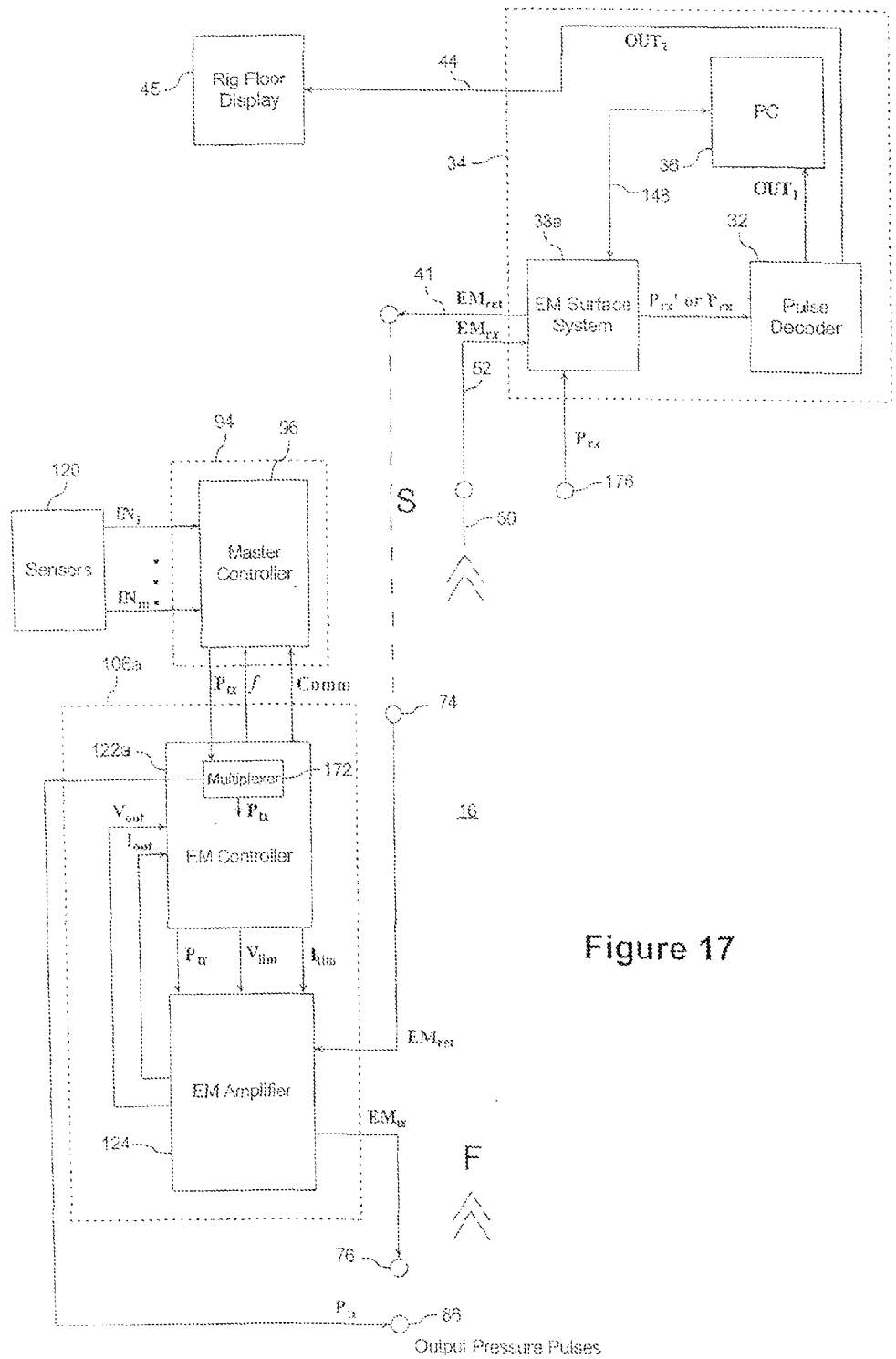
FIG. 17 is a schematic diagram showing data flow in an EM and pulse dual telemetry MWD system.
Figure 18:
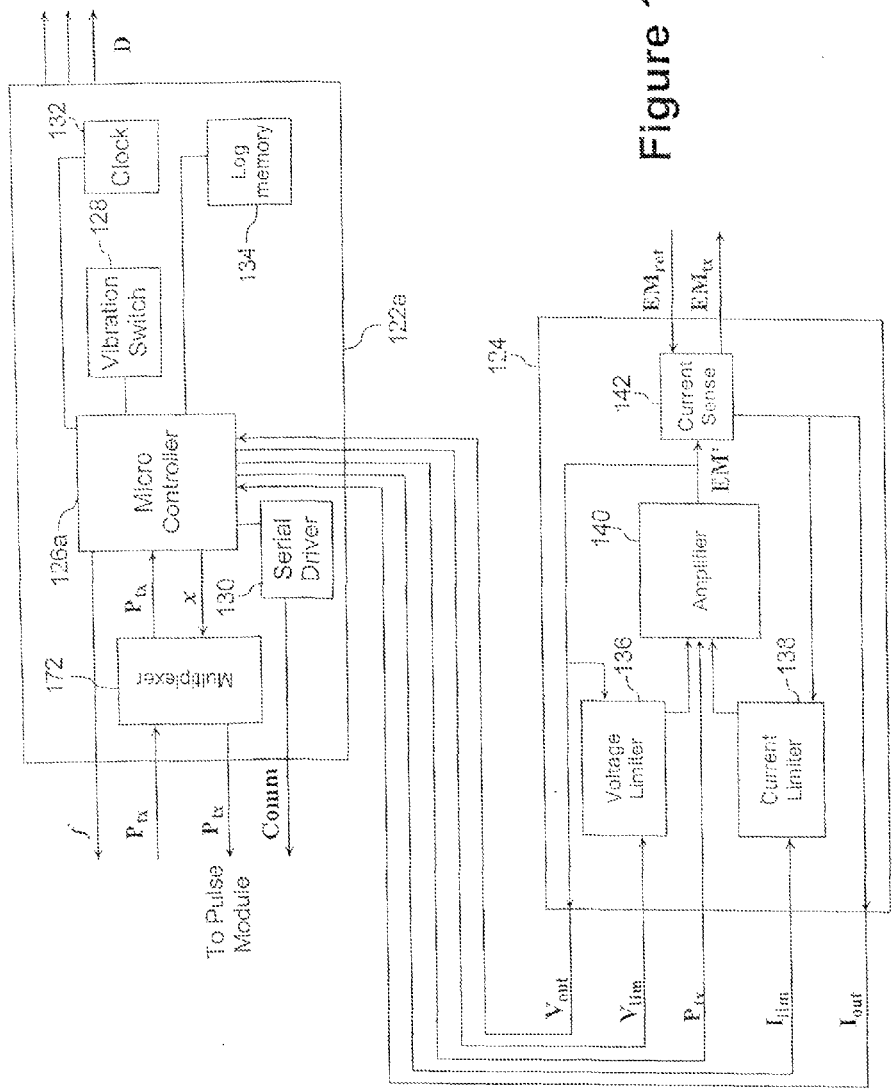
FIG. 18 is a schematic diagram of the EM transmitter module shown in FIG. 17.

FIG. 17 shows an electrical schematic for the second embodiment. It can be seen that the configuration is largely the same with various modifications made to accommodate both telemetry modes. A modified controller module 122a, includes a multiplexer 172 to enable the EM transmitter module 106a to bypass the amplifier module 124 and send the pulse signal $P_{tx}$ directly to the pulse module 84 when operating in pulse telemetry mode. The modified controller module 122a is shown in FIG. 18. It can be seen that the multiplexer 172 is operated by a signal x provided by a modified microcontroller 126a to direct $P_{tx}$ either to the microcontroller 126a or bypass to the pulse module 84. A surface pressure transducer 176 is also shown, which would normally be in fluid communication with the mud column M so as to be able to sense the pressure pulses sent by the pulser module 86. The other components shown in FIG. 18 are similar to those discussed above as indicated by the similar reference numerals and thus details thereof need not be reiterated.

Figure 19:
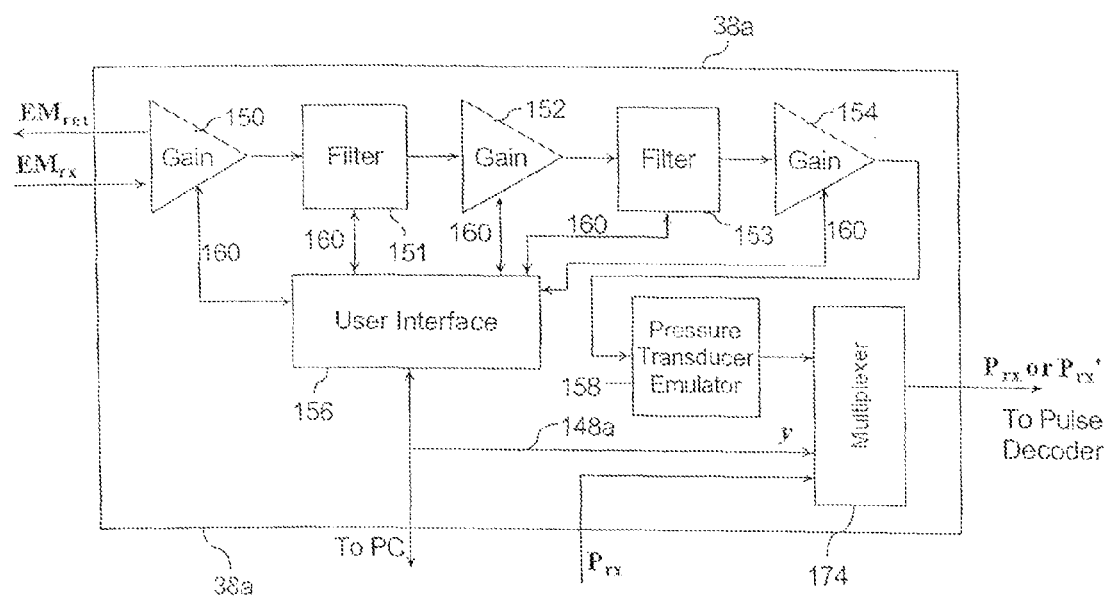
FIG. 19 is a schematic diagram of the EM surface system shown in FIG. 17.

At the surface, a modified EM surface system 38a is used as shown in FIG. 19. It can be seen that the filtering and amplification stages 150-154, user interface port 156 and emulator 158 are the same as shown in FIG. 12. A surface multiplexer 174 is used to enable either the emulated pulse signal $P_{rx}'$ to be sent to the pulse decoder 32 in EM telemetry mode as discussed above, or the normal pulse signal $P_{rx}$ obtained from the pressure transducer 176. A modified interface signal 148 includes a connection to the multiplexer 174 to enable the user to send a mode control signal y to the multiplexer 174 to change telemetry modes.

Exemplary Data Transmission Scheme—Second Embodiment

Figure 20A:
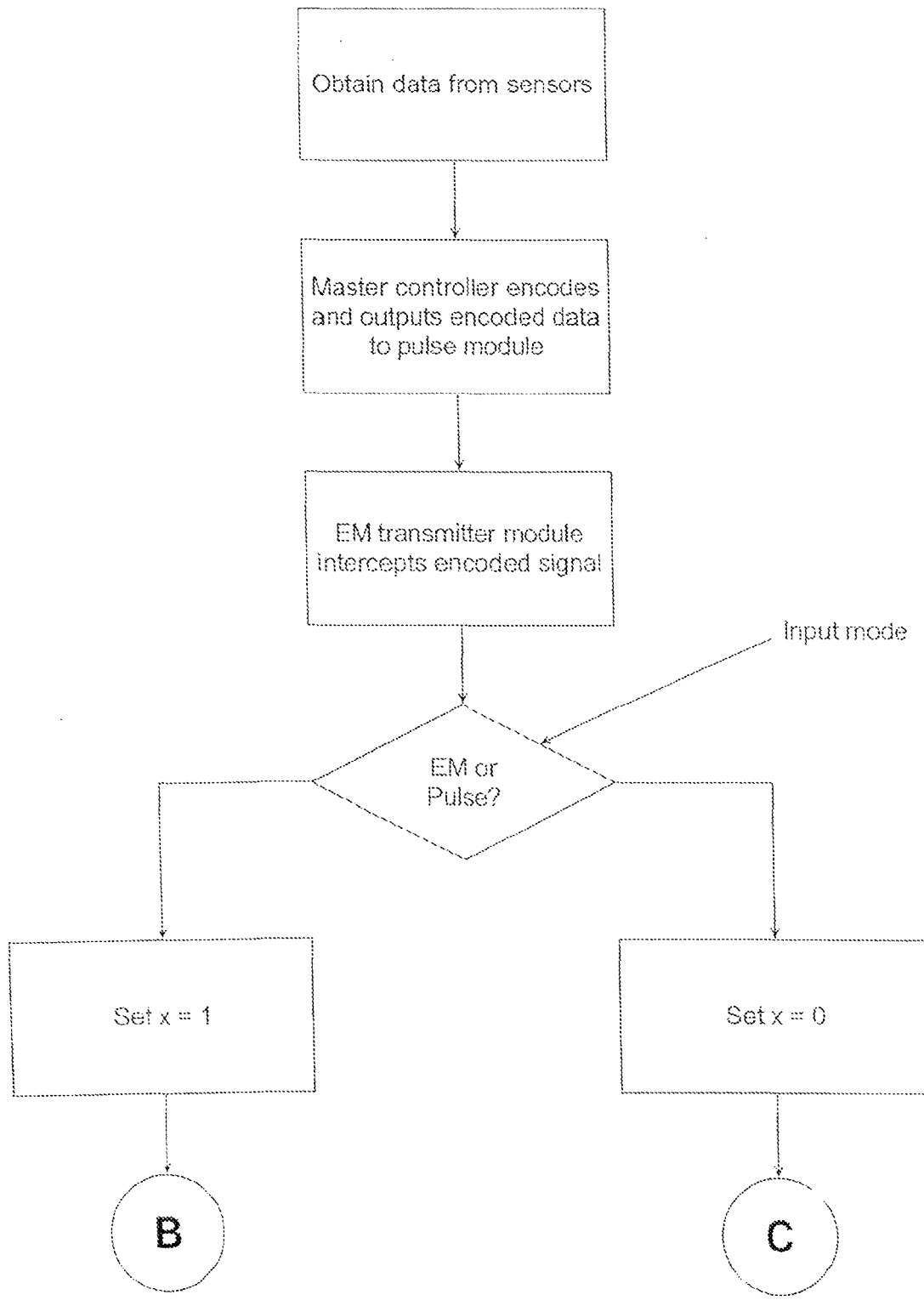
FIG. 20(a) is a flow diagram illustrating a data transmission using EM and pulse telemetry in the EM and pulse dual telemetry MWD system shown in FIG. 17.
Figure 20B:
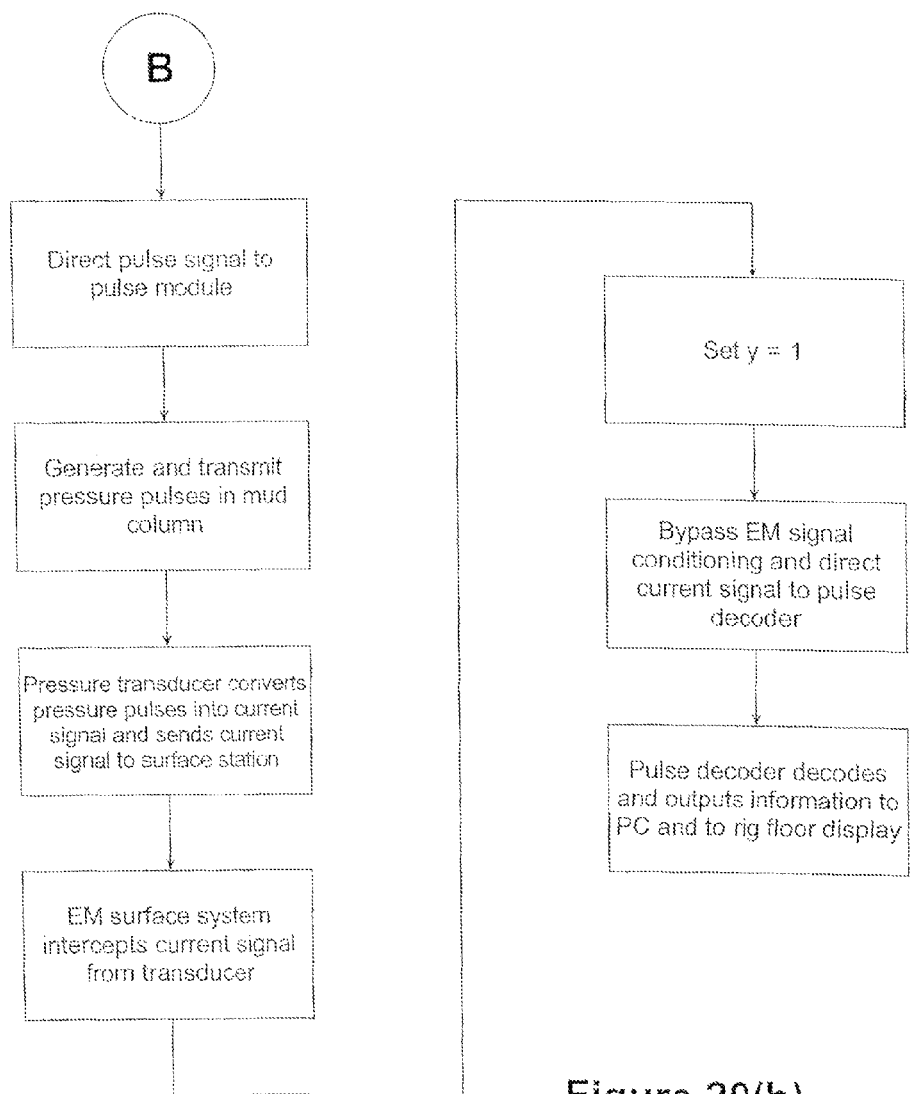
FIG. 20(b) is a flow diagram continuing from B in FIG. 20(a).
Figure 20C:
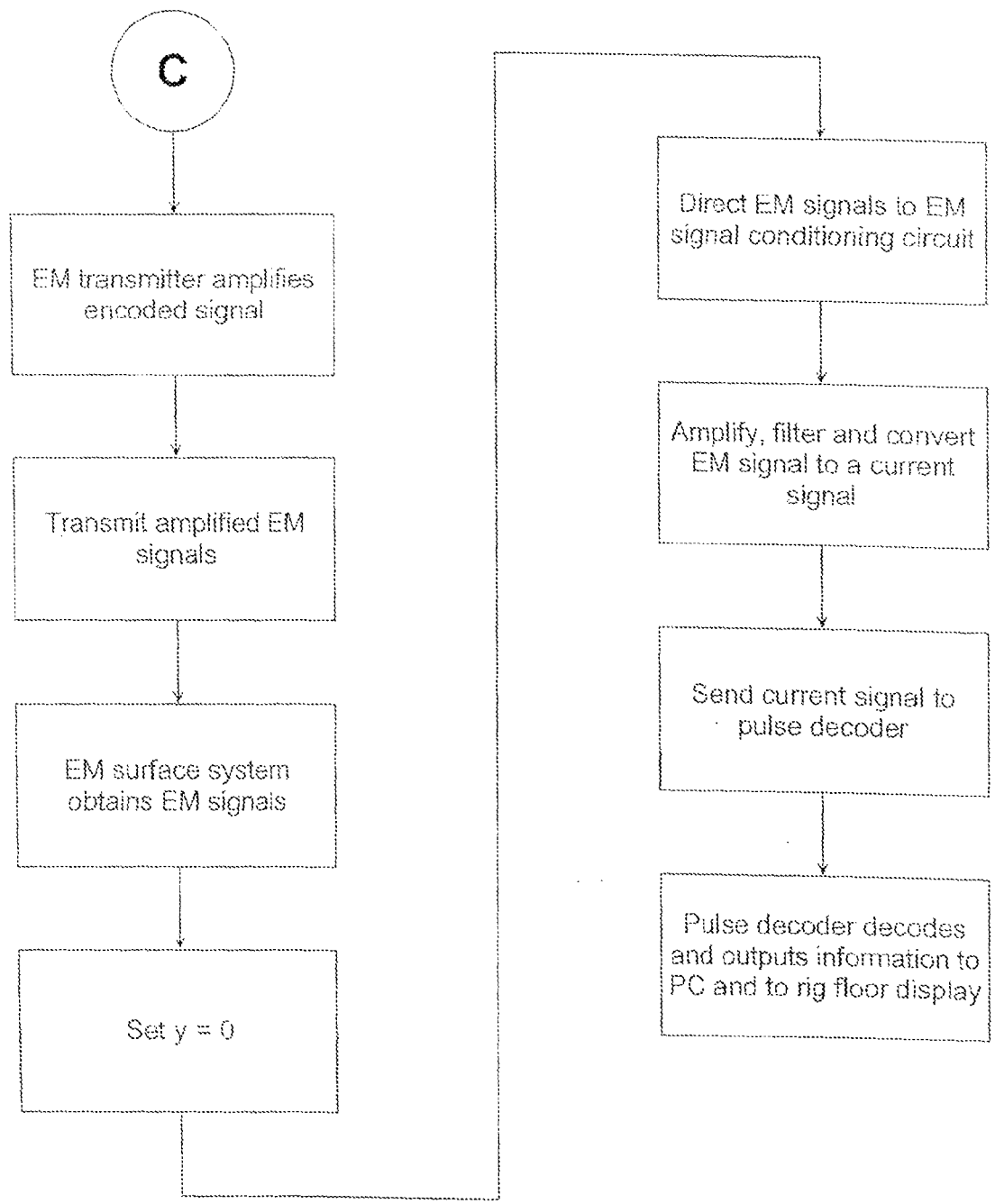
FIG. 20(c) is a flow diagram continuing from C FIG. 20(a).

Referring now to FIGS. 20(a), 20(b) and 20(c), an example data transmission scheme for the second embodiment shown in FIGS. 15-19 will now be explained. Referring first to FIG. 20(a), similar to the first embodiment, data is obtained from the sensors 120 by the master controller 96, and an encoded output is sent to the pulse module 86. Also as before, the EM transmitter module 106 intercepts the encoded signal $P_{tx}$. When in operation, the microcontroller 126a is provided with a mode type, indicating whether to operate in an EM mode or a pulse mode. The telemetry mode can be indicated by downlinking from the surface system 34.

The microcontroller 126 determines the appropriate mode and if pulse telemetry is to be used, control signal x is set to 1 such that the multiplexer 172 directs the pulse signal $P_{tx}$ to the pulse module 86 as can be seen by following "B" to FIG. 20(b). In the pulse mode, the EM transmitter module 106 does not operate on a signal and thus is idle during the pulse mode The pulse module 86 uses the transmit pulse signal $P_{tx}$ to generate a series of pressure pulses in the mud column M, which are sensed by the pressure transducer 176 at the surface, where they are converted into a current signal and sent to the surface station 34.

As before, the EM surface system 38a intercepts the received pulse signal $P_{rx}$ and directs the signal to the pulse decoder 32, thus bypassing the EM circuitry. This is accomplished by having the interface signal 148a set the control signal y=1, which causes the multiplexer 174 to pick up the pulse signal $P_{rx}$. This is then fed directly into the pulse decoder 32, where the signal can be decoded and output as described above.

Turning back to FIG. 20(c), if the microcontroller 126a is instructed to operate in EM telemetry mode, control signal x is set to x=0, which causes multiplexer 172 to direct the pulse transmit signal $P_{tx}$ to the amplifier module 124, which can be seen by following "C" to FIG. 20(c). It can be appreciated from FIG. 20(c) that transmission in the EM telemetry mode operates in the same way as in the first embodiment with the addition of the interface signal 148a setting control signal x to x=0, causing the multiplexer 174 to direct the emulated pulse signal $P_{rx}'$ to the pulse decoder 32. Accordingly, details of such similar steps need not be reiterated.

Therefore, the use of dual telemetry may be accomplished by configuring a dual telemetry tool string 170 as shown in FIG. 16 with a modified EM transmitter module 106, and modifying receiver module 38 to include a multiplexer 174. This enables the EM modules to work with the existing pulse modules. An EM transmission may be used that mimics a mud-pulse transmission or the original pulse signal used. In the result, modifications to the pulse decoder 32, pulse module 86 or landing bit 82 are not required in order to provide an additional EM telemetry mode while taking advantage of an existing mud-pulse telemetry. Moreover, the drill string 20 does not require tripping to switch between mud-pulse telemetry and EM telemetry in the second embodiment.

Further Alternatives

It will be appreciated that the tool strings 100 and 170 can also be modified to include other modules, such as a pressure module (not shown). For example, a similar arrangement as shown in FIG. 3(*b*) could be realized with the pressure module in place of the pulse module 86 and the modified landing bit 104 in place of the landing bit 82. It will be appreciated that the tool string 100 may also be modified to include pulse telemetry, EM telemetry and a pressure module by making the appropriate changes to the drill string 20 to ensure that the isolation exists for EM telemetry.

Although the above has been described with reference to certain specific embodiments, various modifications thereof will be apparent to those skilled in the art as outlined in the claims appended hereto.

The invention claimed is:

1. A method of adapting a commercially available measurement while drilling tool to provide a dual telemetry measurement while drilling tool, the commercially available measurement while drilling tool providing a first transmission module providing one of mud pulse telemetry and electromagnetic telemetry, the method comprising:
    obtaining a second transmission module providing the other of mud pulse telemetry and electromagnetic telemetry; and
    connecting a directional module operable to obtain data from at least one sensor to the first transmission module and the second transmission module to enable the data to be provided to both modules.

2. The method of claim 1, wherein the commercially available measurement while drilling tool comprises the directional module.

3. The method of claim 1, further comprising configuring at least one surface receiver module to receive a signal transmitted by one or more of the first and second transmission modules.

4. The method of claim 1, further comprising connecting at least one battery module to the dual telemetry measurement while drilling tool.

5. The method of claim 1, further comprising enabling an instruction to be received from a surface system to operate in one or more of an electromagnetic telemetry mode and a mud pulse telemetry mode.

6. The method of claim 1, further comprising making a first connection between the dual telemetry measurement while drilling tool and an inner wall of a drill string on one side of a region of isolation of the drill string, and a second connection between the dual telemetry measurement while drilling tool and the inner wall of the drill string on the other side of the region of isolation.

7. The method of claim 6, the first and second connections comprising components extending from the dual telemetry measurement while drilling tool and contacting the inner wall of the drill string.

8. The method of claim 7, the components comprising at least one flexible member to engage the inner wall of the drill string.

9. The method of claim 8, the at least one flexible member comprising a pair of bow springs.

10. The method of claim 1, further comprising connecting a landing bit to the dual telemetry measurement while drilling tool for positioning the dual telemetry measurement while drilling tool within the drill string.

11. The method of claim 10, the landing bit further comprising a mud pulse valve used by the mud pulse module for generating a series of pulses in the mud column.

12. A dual telemetry measurement while drilling tool adapted from a commercially available measurement while drilling tool, the commercially available measurement while drilling tool providing a first transmission module providing one of mud pulse telemetry and electromagnetic telemetry, the dual telemetry measurement while drilling tool further comprising a second transmission module providing the other of mud pulse telemetry and electromagnetic telemetry, and a directional module operable to obtain data from at least one sensor to the first transmission module and the second transmission module to enable the data to be provided to both modules.

13. The dual telemetry measurement while drilling tool of claim 12, wherein the commercially available measurement while drilling tool included the directional module.

14. The dual telemetry measurement while drilling tool of claim 12, further comprising at least one surface receiver module configured to receive a signal transmitted by one or more of the first and second transmission modules.

15. The dual telemetry measurement while drilling tool of claim 12, further comprising at least one battery module.

16. The dual telemetry measurement while drilling tool of claim 12, further configured for enabling an instruction to be received from a surface system to operate in one or more of an electromagnetic telemetry mode and a mud pulse telemetry mode.

17. The dual telemetry measurement while drilling tool of claim 12, further comprising a first connection between the dual telemetry measurement while drilling tool and an inner wall of a drill string on one side of a region of isolation of the drill string, and a second connection between the dual telemetry measurement while drilling tool and the inner wall of the drill string on the other side of the region of isolation.

18. The dual telemetry measurement while drilling tool of claim 17, the first and second connections comprising components extending from the dual telemetry measurement while drilling tool and contacting the inner wall of the drill string.

19. The dual telemetry measurement while drilling tool of claim 18, the components comprising at least one flexible member to engage the inner wall of the drill string.

20. The dual telemetry measurement while drilling tool of claim 19, the at least one flexible member comprising a pair of bow springs.

21. The dual telemetry measurement while drilling tool of claim 12, further comprising a landing bit for positioning the dual telemetry measurement while drilling tool within the drill string.

22. The dual telemetry measurement while drilling tool of claim 21, the landing bit further comprising a mud pulse valve used by the mud pulse module for generating a series of pulses in the mud column.

* * * * *